United States Patent [19]

Kojima et al.

[11] Patent Number: 4,607,292
[45] Date of Patent: Aug. 19, 1986

[54] AUTOMATIC PHASE CONTROL COLOR SIGNAL CIRCUIT FOR VIDEO TAPE RECORDERS OPERATING IN THE NTSC OR PAL SYSTEMS

[75] Inventors: Noboru Kojima, Yokohama; Tomomitsu Kuroyanagi, Katsuta; Akira Shibata, Katsuta; Isao Nakagawa, Katsuta, all of Japan

[73] Assignee: Hitachi, Ltd., Tokyo, Japan

[21] Appl. No.: 480,790

[22] Filed: Mar. 31, 1983

[30] Foreign Application Priority Data

Apr. 2, 1982 [JP] Japan ................................. 57-53821
Jul. 26, 1982 [JP] Japan ................................ 57-128914
Jan. 28, 1983 [JP] Japan ................................. 58-11560
Jan. 28, 1983 [JP] Japan ................................. 58-11557

[51] Int. Cl.$^4$ ........................................... H04N 5/782
[52] U.S. Cl. .................................. 358/310; 358/11; 358/21 R; 358/140
[58] Field of Search ............... 358/310, 324, 325, 326, 358/140, 38, 21 R, 24, 11

[56] References Cited

U.S. PATENT DOCUMENTS 4,010,490 3/1977 Ota .......................................... 358/4

FOREIGN PATENT DOCUMENTS 2900397 12/1979 Fed. Rep. of Germany .
2013066 8/1979 United Kingdom .

OTHER PUBLICATIONS

Nakagawa et al, "New Chrominance Signal Processing LSI For Home VCR", Hitachi, Ltd., Tokyo, Japan, pp. 1-8.

Primary Examiner—Robert L. Richardson
Attorney, Agent, or Firm—Antonelli, Terry & Wands

[57] ABSTRACT

A color signal processing circuit in a video tape recorder for recording a low frequency converted color signal has a voltage controlled oscillator for generating a carrier having a center frequency which is M times as high as a low-frequency sub-carrier frequency, where M is an integer, and a detection circuit for detecting a variation of the oscillation frequency of the voltage controlled oscillator in at least a reproduction mode. A suppression circuit suppresses the change of the oscillation frequency of the voltage controlled oscillator in response to the output signal from the detection means and a control circuit changes the center oscillation frequency of the voltage controlled oscillator depending on whether the signal is processed in the NTSC system or the PAL system in such a way that the suppression range for the change of the oscillation frequency of the voltage controlled oscillator by the suppression for the NTSC system is equal to or wider than that for the PAL system. The control circuit includes a pulse-eliminating frequency divider or a variable frequency division factor.

9 Claims, 51 Drawing Figures

FIG. 15a
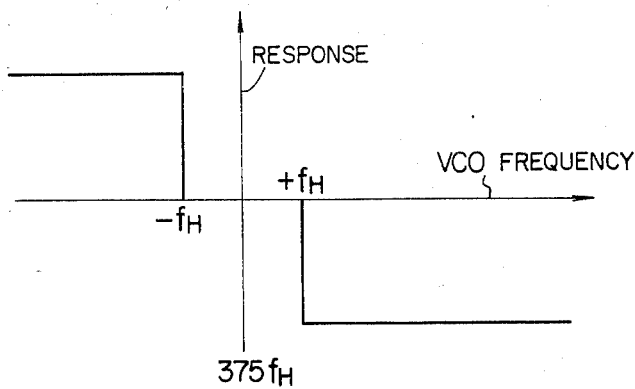
FIG. 15b
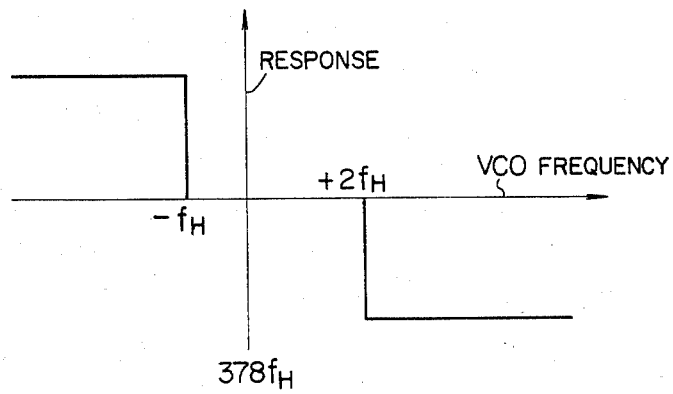
FIG. 18
| u-v | PAL NTSC | $(8v+1)f_H$ | $(8v-1)f_H$ | $(8v+3)f_H$ | $(8v-3)f_H$ |
|---|---|---|---|---|---|
| -2 | $(8u+2)f_H$ | $-15f_H$ | $-13f_H$ | $-17f_H$ | $-11f_H$ |
|    | $(8u-2)f_H$ | $-19f_H$ | $-17f_H$ | $-21f_H$ | $-15f_H$ |
| -1 | $(8u+2)f_H$ | $-7f_H$ | $-5f_H$ | $-9f_H$ | $-3f_H$ |
|    | $(8u-2)f_H$ | $-11f_H$ | $-9f_H$ | $-13f_H$ | $-7f_H$ |
| 0  | $(8u+2)f_H$ | $f_H$ | $3f_H$ | $-f_H$ | $5f_H$ |
|    | $(8u-2)f_H$ | $-3f_H$ | $-f_H$ | $-5f_H$ | $f_H$ |
| 1  | $(8u+2)f_H$ | $9f_H$ | $11f_H$ | $7f_H$ | $13f_H$ |
|    | $(8u-2)f_H$ | $5f_H$ | $7f_H$ | $3f_H$ | $9f_H$ |
| 2  | $(8u+2)f_H$ | $17f_H$ | $19f_H$ | $15f_H$ | $21f_H$ |
|    | $(8u-2)f_H$ | $13f_H$ | $15f_H$ | $11f_H$ | $17f_H$ |

AUTOMATIC PHASE CONTROL COLOR SIGNAL CIRCUIT FOR VIDEO TAPE RECORDERS OPERATING IN THE NTSC OR PAL SYSTEMS

CROSS-REFERENCES OF THE RELATED APPLICATIONS

This application relates to copending U.S. applications Ser. No. 274,275 filed June 16, 1981 and Ser. No. 438,246 filed Nov. 1, 1982 assigned to the present assignee.

BACKGROUND OF THE INVENTION

The present invention relates to a video tape recorder (VTR) or a video cassette recorder (VCR) which converts a luminance signal of a color television signal to an FM signal and a chrominance signal to a low frequency carrier for recording, and more particularly to a color signal processing circuit for a VTR and a frequency divider suitable for use therewith.

In a helical scan type video tape recorder having a rotary head, a jitter component may be superimposed on the reproduced signal due to an error in the video tape feed speed. In the video tape recorder which converts the color signal to a low frequency for recording, such a jitter component causes a variation of the frequency of the reproduced color carrier wave, which results in a shift of the color phase.

FIG. 1 shows one example of a prior art color signal reproducing circuit in a VHS (video home system) video tape recorder, which has been used as means to compensate for the jitter component which causes the shift of the color phase. The jitter component compensation means used in the video tape recorder is now explained with reference to FIG. 1.

In a playback mode, a signal reproduced by a playback head, not shown, from a video tape is supplied to an input terminal 1 which is connected to a low-pass filter (LPF) 4. A reproduced low frequency converted color signal taken out of the LPF 4 is reconverted to a color signal of an original sub-carrier band by a frequency converter 5 and it is supplied through a band-pass filter (BPF) 6 and a comb filter 7, which eliminates cross-talk components from adjacent video tracks, to an output terminal 3. The frequency of the color signal supplied to the output terminal 3 is represented by $(f_{sc}+f_r)-(f_r+\Delta f)=f_{sc}-\Delta f$, where $f_r$ is the frequency of the low frequency converted color signal, $f_{sc}$ is the frequency of the color signal in the color sub-carrier band ($f_{sc}$ is 3.579545 MHz for the NTSC system) and $f_{sc}+f_r$ is the frequency of the converted carrier from a BPF 14. Thus, since the low frequency converted color signal $f_r$ from the LPF 4 includes the jitter component $\Delta f$, the color signal at the output terminal 3 includes the jitter component $\Delta f$. By superimposing the jitter component $\Delta F$ on the converted carrier from the BPF 14 to change the frequency thereof to $f_{sc}+f_r+\Delta f$, the frequency of the color signal is $(f_{sc}+f_r+\Delta f)-(f_r+\Delta f)=f_{sc}$ and the jitter component $\Delta f$ is compensated.

In the above example, the jitter component $\Delta f$ is compensated by a phase locked loop (PLL), particularly by an automatic phase control (APC) including at least the first frequency converter 5, the BPF 6, a phase detector 9, a voltage controlled oscillator (VCO) 10, a frequency divider 11, a phase shifter 12, a second frequency converter 13 and the BPF 14. A burst signal $(f_{sc}+\Delta f)$ of the color signal at the output terminal 3 which includes the jitter component $\Delta f$ and an output signal of an oscillator 8 for the sub-carrier of the frequency $f_{sc}$ are phase detected, and an oscillation frequency of the VCO 10 having a center frequency of approximately 4 $f_r$ ($f_r=40$ $f_H$ for the VHS system and $f_H=(44-\frac{1}{4})f_H$ the $\beta$ system, where $f_H$ is a horizontal scan frequency) is controlled by the phase detection signal. Assuming that the oscillation frequency $f_{VCO}$ of the VCO 10 is $4(f_r+\Delta f)$, it is frequency divided by a factor of four by the frequency divider 11, an output of which is supplied to the frequency converter 13 and the sum frequency $f_{sc}+(f_r+\Delta f)$ of the output signal from the frequency converter 13 and the output signal from the oscillator 8 having the frequency of $f_{sc}$ is taken out as the converted carrier frequency. The converted carrier is supplied to the first frequency converter 5 to compensate for the jitter component as described above.

However, a compensation range for the jitter component $\Delta f$ by the APC of the above example is $\pm f_H/2$ for the NTSC system. If $\Delta f=f_H$, the APC is stabilized when the oscillation frequency of the VCO 10 is $4(f_r+f_H)$ and the sub-carrier frequency of the color signal supplied to the output terminal 3 is $f_{sc}+f_H$. Accordingly, the system is not exactly pulled into $f_{sc}$. In order to prevent the stabilization of the system in an error state, a frequency discriminator 15 is provided in the above example. The frequency discriminator 15 controls the VCO 10 when the jitter component $\Delta f$ is larger than $\pm f_H/2$ to prevent the deviation of the output of the VCO 10 from $4 f_r \pm 2 f_H$.

FIG. 2 shows an example of the frequency discriminator 15. The examples shown in FIGS. 1 and 2 are for the VHS system and the frequency $f_{VCO}$ of the VCO 10 is selected to be 160 $f_H$. The frequency discriminator 15 comprises a gate circuit 16, a frequency divider 26 which divides an H pulse of 1 H period (where H is one horizontal scan period) from an input terminal 2, a frequency counter including frequency dividers 17-23 and gate circuits 24 and 25, and a decoder 27. In operation, the H pulse from the input terminal 2 is frequency divided by a factor of eight by the frequency divider 26 to produce a pulse having a period of 8 H and a duty factor of 50%, which pulse is supplied to the gate circuit 16 so that the output pulses from the VCO 10 having the center frequency of approximately 160 $f_H$ are counted only for 4 H period of the 8 H period, and if the pulse count is 640±1, the decoder 27 produces no control signal, if it is no more than 638 or no less than 642, the decoder 27 produces a control signal to the VCO 10 to increase or decrease the frequency of the VCO 10, respectively. An example of the control characteristic of the frequency discriminator 15 is shown in FIG. 3a. An example of conversion of the control characteristic to the oscillation frequency $f_{VCO}$ of the VCO 10 is shown in FIG. 3b. When the oscillation frequency $f_{VCO}$ of the VCO 10 is within the center frequency 160 $f_H \pm f_H/2$, the control signal to control the oscillation frequency $f_{VCO}$ of the VCO 10 is not produced, and when the oscillation frequency $f_{VCO}$ deviates by more than $\pm f_H/2$, the control signal of appropriate polarity is produced by the decoder 27 so that the frequency deviation of the VCO 10 is always pulled into the range of $\pm f_H/2$.

The reason for selecting the pull-in range of the oscillation frequency of the VCO 10 by the frequency discriminator 15 to be $\pm f_H/2$ is to allow the frequency discriminator 15 to be used for both the NTSC system and the CCIR (Comit'e Consultatif International des Radio Communication) system e.g., the PAL system.

The compensation range for the jitter component $\Delta f$ by the APC is $\pm f_H/2$ for the NTSC system as described above, while it is $\pm f_H/4$ for the PAL system. In actual practice, however, the compensation range imposed upon the APC should be smaller than that described above. Assuming that a margin for the compensation range is, for example, more than 6 dB, the compensation range by the APC should be set to less than $\pm f_H/4$ for the NTSC system and less than $\pm f_H/8$ for the PAL system. To convert them to the deviations of the oscillation frequency $f_{VCO}$ of the VCO 10, it is $\pm f_H$ for the NTSC system and $\pm f_H/2$ for the PAL system. Accordingly, the pull-in range of the oscillation frequency $f_{VCO}$ of the VCO 10 by the frequency discriminator 15 should be less than $\pm f_H$ for the NTSC system and less than $\pm f_H/2$ for the PAL system. Thus, in order to allow the frequency discriminator 15 to be used for both the NTSC system and the PAL system, the pull-in range of the VCO 10 is selected to be that of the PAL system, that is, $\pm f_H/2$.

In the video tape recorder, the carrier frequency of the low frequency converted signal for the NTSC system is different from that for the PAL system. Accordingly, the frequency $f_r + \Delta f$ corresponding to the low frequency converted carrier frequency of the converted carrier frequency $f_{sc} + (f_r + \Delta f)$ should be differently set for the NTSC system and the PAL system. This is necessary in order to visually reduce a beat disturbance appearing in the luminance signal due to a secondary distortion component $2 f_r$ of the low frequency converted color signal $f_r$ produced by the tape/head. The beat disturbance can be visually reduced by imparting an offset of $f_H/4$ to the low frequency converted color sub-carrier frequency $f_r$ for the NTSC system, and an offset of $3 f_H/8$ for the PAL system.

In the present VHS system, for the NTSC system, the output signal from the VCO 10 of FIG. 1 is frequency divided by a factor of four to produce a signal 40 $f_H$, which is phase shifted by the phase shifter 12 by $\pi/2$ for each 1H so that the offset of $f_H/4$ is equivalently imparted to the signal supplied from the phase shifter 12 to the second frequency converter 13 in order to provide the offset of $f_H/4$ to the low frequency converted color sub-carrier in the record mode. For the PAL system, an oscillator (not shown) having an oscillation frequency offset by $f_H/8$ is provided in addition to the oscillator 8 of the frequency $f_{sc}$ and it is connected to the frequency converter 13 in place of the oscillator 8 of the frequency $f_{sc}$, and the oscillator 8 is connected to the phase detector 9 as shown in FIG. 1 so that the offset of $f_H/8$ is imparted to the component $f_{sc}$ of the converted carrier in order to impart the offset of $f_H/8$ to the low frequency converted color sub-carrier in the record mode. In this manner, the component $f_r + \Delta f$ is differently set for the NTSC system and the PAL system in order to allow the selection of the same center frequency of the VCO 10 for both systems.

Thus, the low frequency converted color sub-carriers for the respective systems are different from each other by at least the offset amounts for the respective systems. However, since the offset is formed by other than the PLL which includes the frequency discriminator 15 and the VCO 10, the same center frequency of the VCO 10 can be used for the NTSC system and the PAL system. Accordingly, by selecting the pull-in range of the oscillation frequency of the VCO 10 to be that for the PAL system, that is, $\pm f_H/2$, the frequency discriminator 15 can be used for both the NTSC system and the PAL system, as described above.

However, the prior art example requires two oscillators of the frequency of approximately fsc for the CCIR system in order to allow the use of the frequency discriminator for both systems, and hence the cost substantially increases. If the number of oscillators for the PAL system is reduced to one in order to suppress the increase of cost, the oscillation frequency of the VCO 10 should be set differently for the NTSC system and the PAL system. In this case, the frequency discriminator cannot be used in common for both the NTSC and PAL systems. If the center frequency of the VCO 10 for the PAL system is set to be $f_H/2$ higher than that for the NTSC system, and if the pull-in range of the frequency discriminator 15 for the NTSC system is selected as shown in FIG. 3b, the pull-in range for the PAL system is that shown in FIG. 3c, in which the center frequency of the VCO 10 is $(160 + \frac{1}{2}) f_H$. As a result, the pull-in range of the oscillation frequency of the VCO 10 cannot be within $\pm f_H/2$. Thus, the jitter component cannot be correctly compensated in the PAL system and a color phase shift appears on a reproduced image.

In a video tape recorder which converts a luminance signal to an FM signal and low frequency converts a color signal and frequency-multiplexes it on a low frequency side of the FM signal and overwrites the signals for each field by two heads having different azimuth angles, cross-talk components of the color signals from adjacent video tracks raise a problem because an azimuth effect is not attained for the low frequency color signal. To resolve the above problem, the prior art NTSC video tape recorder imparts an offset of $f_H/2$ to the low frequency converted color signal between the fields in the record mode and uses a comb filter for the color signal in the playback mode.

The approach to resolve the cross-talk problem is now explained.

In the $\beta$ system video tape recorder, a phase invert (PI) system is adopted in which the low frequency converted color signal frequency is selected to be $(44 - \frac{1}{4}) f_H$ and the low frequency converted color signal of only one field is phase inverted by 180 degrees for every horizontal scan period (1H). By imparting the offset of $f_H/2$ to the low frequency converted color signals of adjacent fields, the cross-talk components from the adjacent tracks have the offsets of $f_H/2$ to the color signal from the main track upon reproduction. Accordingly, the cross-talk components are suppressed by passing the color signal including the cross-talk components through the comb filter having a comb valley frequency offset by $(N + 1/N) f_H$ (where N is an integer) with respect to a center frequency of the color sub-carrier.

However, a problem arises in imparting the offset of $f_H/2$. FIG. 4 shows an example of the $\beta$ system color signal processing circuit. The problem encountered in the prior art now will be explained with reference to FIG. 4, in which numeral 201 denotes an input terminal for a color signal, numeral 202 denotes an input terminal for a synchronizing signal or a signal synchronized thereto, numeral 203 denotes an input terminal for a pulse which is phase inverted for every 1H, numeral 204 denotes an input terminal for a track address signal, numeral 205 denotes an output terminal for a low frequency converted color signal, numeral 206 denotes a voltage controlled oscillator (VCO) having an oscillation frequency of 175 $f_H$, numeral 207 denotes a one-tofive frequency divider, numeral 208 denotes a one-to-thirty-five frequency divider, numeral 209 denotes a phase comparator for comparing a phase of the frequency-divided output of the VCO 206 and a phase of the horizontal synchronizing signal from the input terminal 202, numeral 210 denotes a one-to-four frequency divider, numeral 211 denotes a second frequency converter, numeral 212 denotes a band-pass filter (BPF) for extracting a sum frequency from the frequency converter 211, numeral 213 denotes a circuit which is non-operative in a first track and reverses phase for every 1H in a second track, numeral 214 denotes a first frequency converter, numeral 215 denotes a low-pass filter (LPF) for extracting a difference frequency signal from the frequency converter 214, numeral 216 denotes a 3.58 MHz crystal VCO, and numeral 217 denotes a phase comparator for comparing the phase of the signal from the crystal VCO 216 and the phase of a burst signal from a burst gate circuit 218. Thus, a low frequency carrier of $(44-\frac{1}{4}) f_H$ synchronized with the horizontal synchronizing signal is produced at the output terminal of the one-to-four frequency divider 210, and a carrier having the same frequency as the color signal applied to the input terminal 201 is produced at the output terminal of the crystal VCO 216. Those two carriers are supplied to the first frequency converter 211 so that a signal of $(3.58 \text{ MHz} + 175/4 \ f_H)$ is extracted at the output terminal of the BPF 212, and a signal of $(3.58 \text{ MHz} + 175/4 \ f_H)$ for the first track and a signal of $\{3.58 \text{ MHz} + (175/4 \pm \frac{1}{2}) \ f_H\}$ for the second track are produced at the output terminal of the phase inverter 213. Accordingly, the color signal converted down to $175/4 \ f_H$ is produced at the output terminal 205 in the first track period, and the color signal converted down to $(175/4 \pm \frac{1}{2}) \ f_H$ is produced in the second track period. In this manner, the low frequency converted color signals offset by $f_H/2$ between the tracks (or fields) are produced.

However, since this circuit includes the phase inverter 213 succeeding the second frequency converter 211, the frequency of a signal subjected to phase inversion is high, that is, approximately 4.27 MHz and hence it is difficult to secure the phase reversal angle of 180 degrees. The shift of the phase reversal angle causes the degradation of the cross-talk suppression effect on the color signal. If it shifts by five degrees, the cross-talk suppression is approximately 15 dB at maximum and the quality of the reproduced image is materially degraded.

In addition, since the phase inverter 213 is inserted following the BPF 212, it is difficult to incorporate the phase inverter 213 in an IC module when the color signal processing circuit is to be constructed in the IC module and hence the number of peripheral parts increases.

The prior art described above is disclosed in an article "New Chrominance Signal Processing LSI for Home VCR" by Nakagawa et al, IEEE Transactions on Consumer Electronics, Vol. CE-26, August 1980, pages 315-322.

SUMMARY OF THE INVENTION

It is an object of the present invention to provide a color signal processing circuit for a video tape recorder which has a single sub-carrier $f_{sc}$ oscillator used in common to the NTSC system and the PAL system and enables stable color reproduction.

It is another object of the present invention to provide a color signal processing circuit for a video tape recorder which uses a sub-carrier oscillator in an APC circuit and uses a frequency discriminator of the APC circuit for controlling a frequency shift of a VCO in common to the NTSC system and the PAL system.

It is a further object of the present invention to provide a color signal processing circuit which can be implemented by an IC module to reduce cost and the number of peripheral parts, which secures a cross-talk suppression effect to the color signal and improves the phase response characteristic of the color signal in a playback mode.

It is still another object of the present invention to provide a color signal processing circuit for a video tape recorder having a frequency divider which attains frequency division operations of different division factors for the NTSC system and the PAL system in a very simple manner and which is commonly used for both systems.

In order to achieve the above objects, according to one aspect of the present invention, the center oscillation frequency of the VCO in the APC circuit of the color signal processing circuit is changed for the NTSC system and the PAL system so that a single oscillator is used for both systems, and the pull-in range of the VCO by the frequency discriminator of an AFC circuit for controlling the VCO in the NTSC system is selected to be equal to or larger than that in the PAL system so that a stable color signal is reproduced in both systems.

According to another aspect of the present invention, the center oscillation frequency of the VCO in the above color signal processing circuit is selected to be eight times as high as the low frequency converted color sub-carrier and 3N times (where N is an integer) as high as the horizontal synchronizing frequency of the video signal, and the pull-in range of the VCO is controlled by the frequency discriminator. As a result, the VCO in the frequency discriminator can be used in common for the NTSC system and the PAL system and a detection circuit for the oscillation frequency $f_{VCO}$ of the VCO can be constructed for the frequency band counted down by a factor of three, and the number of flip-flops driven at a high speed can be minimized. Thus, a circuit can be constructed to be adapted for an IC structure.

According to another aspect of the present invention, in the NTSC system, 180-degree phase reversal is effected for the low frequency carrier at the input of the second frequency converter every second field, and the low frequency converted color signals which are phase-inverted by 180 degrees for every 1H in every other track, these tracks recording the lower frequency converted color signals in the field, have the same horizontal period, with one being the non-inverted signal and the other being the inverted signal. With this circuit arrangement, the color signal processing circuit which records the color signal by the phase inversion in the NTSC system can be readily implemented by an IC structure, the cross-talk suppression effect is improved, the phase response speed of the reproduced color signal is improved and the quality of image is improved. It can be used in common to the color signal processing circuit which records the color signal in 90-degree phase inversion in the PAL system so that the PAL IC and the NTSC IC can be combined to reduce the cost of the IC.

In accordance with another aspect of the present invention, the color signal processing circuit including the frequency divider selectively takes out the input pulses to the frequency divider or the pulses in the frequency divider in accordance with the frequency division factor by the signal which is phase compared with the output of the frequency divider so that the frequency division factor is changed while the frequency division factor of the frequency divider is fixed. For example, if the input pulses to the 1-to-320 frequency divider are eliminated one pulse for each horizontal synchronizing pulse, 320 pulses out of 321 input pulses are supplied to the frequency divider. Thus, looking from the input, the 1-to-321 frequency division is attained. Thus, for the PAL system, the pulses are selectively eliminated in this manner, and for the NTSC system, all of the pulses are supplied. As a result, the 1-to-320 frequency division for the NTSC system and the 1-to-321 frequency division for the PAL system are attained. If the frequency division factor of the fixed frequency divider is an even number, the duty factor of the pulses without elimination is exactly 50%, and the duty factor of the pulses with elimination slightly changes from 50% depending on the number of pulses eliminated and can be approximated to 50%. By selecting the frequency division operations of slightly different frequency division factors, the VCO of the chrominance signal processing circuit can be operated at different multiples of the reference frequency for the respective system.

BRIEF DESCRIPTION OF THE DRAWINGS

The preferred embodiments of the present invention now will be explained in detail in connection with the accompanying drawings, in which:

FIG. 18 shows a chart for explaining a reason for selecting an oscillation frequency of a VCO controlled by a frequency discriminator to an integer multiple of 3 $f_H$.

DETAILED DESCRIPTION OF THE PREFERRED EMBODIMENTS

Figure 5A:
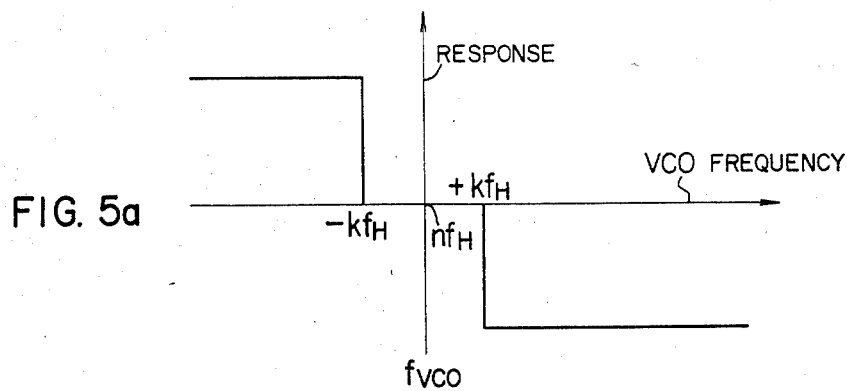
FIGS. 5a and 5b show control characteristics of a frequency discriminator of the present invention.
Figure 5B:
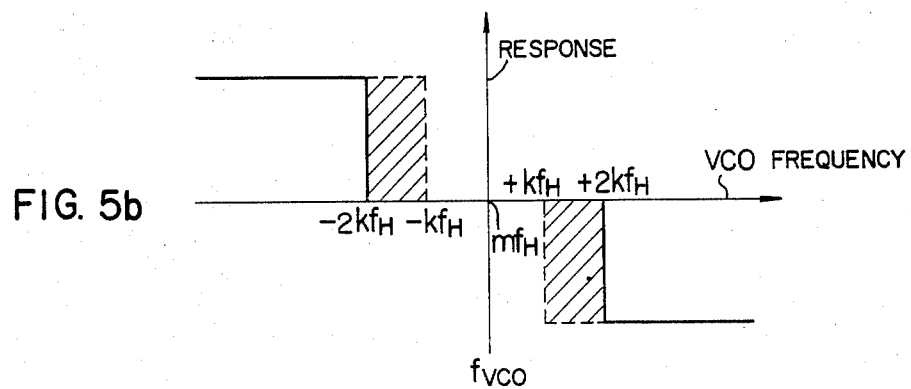

FIG. 5 shows control characteristics of a VCO 10 by a frequency discriminator 15 of the present invention. FIG. 5a shows the control characteristic of the VCO 10 by the PAL system frequency discriminator 15, and FIG. 5b shows the control characteristic for the NTSC system. A principle of the present invention is explained with reference to FIGS. 5a and 5b.

Figure 4:
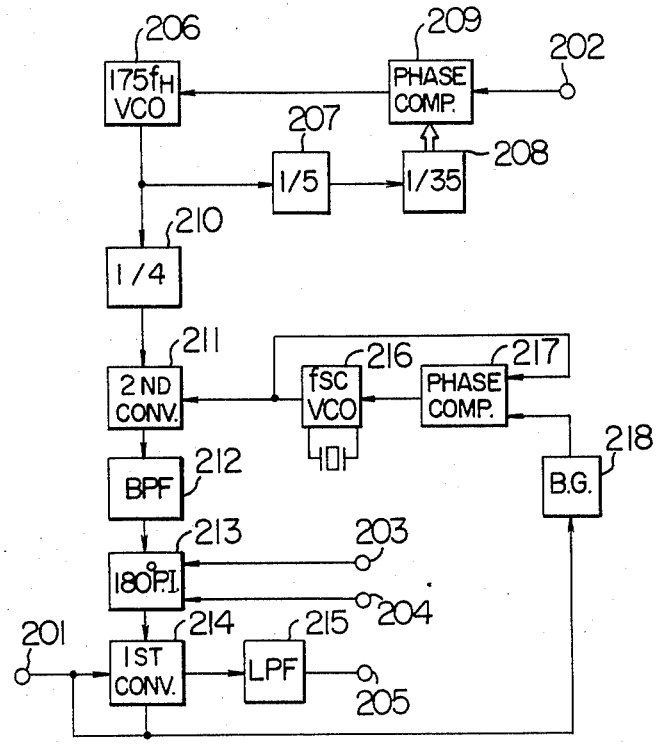
FIG. 4 shows a block diagram of a β system NTSC color signal recording circuit.

An oscillation frequency $f_{VCO}$ of the VCO 10 of FIG. 4 is selected to be n $f_H$ for the PAL system and m $f_H$ for the NTSC system, where n and m are positive integers different from each other. As shown in FIG. 5a, for the control characteristic of the frequency discriminator 15 for the PAL system, a center frequency of a pull-in range of the oscillation frequency $f_{VCO}$ of the VCO 10 is selected to approximately n $f_H$ and the pull-in range is selected to $\pm k$ $f_H$ (where k is a positive number). As shown in FIG. 5b, for the control characteristic for the NTSC system, the center frequency of the pull-in range of the oscillation frequency $f_{VCO}$ of the VCO 10 is selected to approximately m $f_H$ and the pull-in range is selected to $\pm k$ $f_H - \pm 2k$ $f_H$ as shown by the hatched areas. By changing the center frequency of the pull-in range of the oscillation frequency $f_{VCO}$ of the VCO 10 by the frequency discriminator 15 for the NTSC system from that for the PAL system, the stabilization of the oscillation frequency of the VCO 10 at an incorrect point in the respective systems is prevented.

Figure 1:
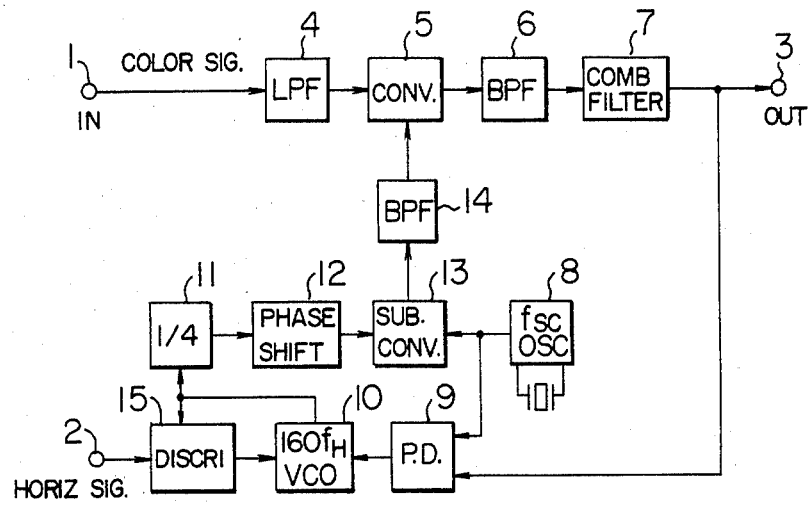
FIG. 1 shows a block diagram of a prior art color signal playback circuit.

The compensation range for the jitter component $\Delta f$ by the PLL in the example shown in FIG. 1 is $\pm f_H/4$ for the PAL system and $\pm f_H/2$ for the NTSC system, as described above. Accordingly, when the carrier frequency $f_r$ of the low frequency converted color signal is p $f_H$ for the PAL system and q $f_H$ for the NTSC system (where p and q are positive numbers), the oscillation frequencies of the VCO 10 are selected to be n $f_H$=lp $f_H$ and m $f_H$=lq $f_H$, respectively (where l is a positive integer). The compensation ranges for the jitter component $\Delta f$ in the PLL are converted to oscillation frequencies of $\pm l f_H/4$ and $\pm l f_H/2$, respectively. Accordingly, the pull-in ranges of the VCO 10 by the frequency discriminator 15 must be selected to less than $\pm l f_H/4$ and $\pm l f_H/2$, respectively. In other words, the pull-in range of the VCO 10 by the frequency discriminator 15 for the NTSC system has twice as large a margin as that for the PAL system. Accordingly, as shown in FIGS. 5a and 5b, the pull-in range of the VCO 10 by the frequency discriminator 15 for the NTSC system can be expanded to an extent of being twice as large as that for the PAL system. Thus, the configuration of the frequency divider 15 for both systems is simplified.

One embodiment of the frequency discriminator 15 of the present invention is now explained. In the present embodiment, it is assumed that the carrier frequencies $f_r$ of the low frequency converted color signals in the PAL system and for the NTSC system are $(47-\frac{1}{8})$ $f_H$ and $(47+\frac{1}{4})$ $f_H$, respectively, and the oscillation frequencies of the VCO 10 are 8 $(47-\frac{1}{8})$ $f_H$=375 $f_H$ and 8$(47+\frac{1}{4})$ $f_H$=378 $f_H$, respectively.

Figure 6:
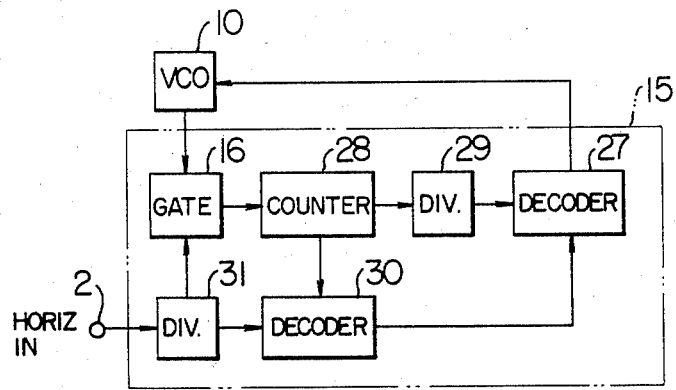
FIG. 6 shows a block diagram of one embodiment of the frequency discriminator of the present invention.

FIG. 6 shows one embodiment of the frequency discriminator of the present invention. The present embodiment counts the output pulses of the VCO 10 to detect the deviation of the frequency $f_{VCO}$ of the VCO 10 for the PAL system and for the NTSC system to control the VCO 10.

Figure 7:
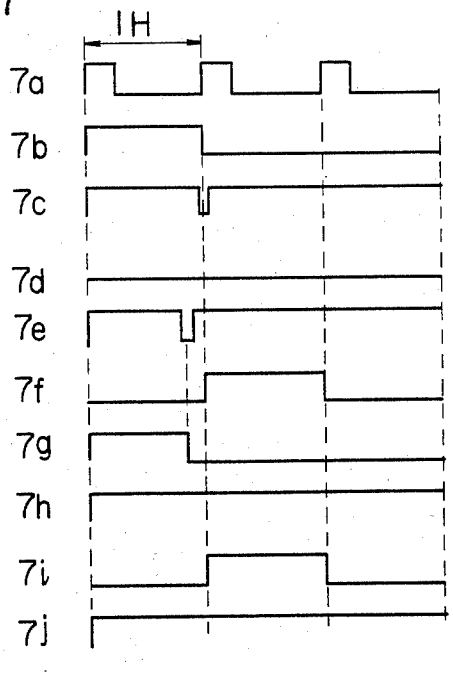
FIGS. 7a to 7j show waveforms in the embodiment of FIG. 6.

In FIG. 6, the center oscillation frequency $f_{VCO}$ of the VCO 10 is n $f_H$=375 $f_H$ for the PAL system and m $f_H$=378 $f_H$ for the NTSC system. Numeral 28 denotes a frequency counter, numerals 29 and 31 denote frequency dividers and numeral 30 denotes a decoder which produces a detection pulse. FIG. 7 shows a time chart for explaining the operation of FIG. 6. FIG. 7a shows an H pulse synchronized with the horizontal synchronizing signal and FIG. 7b shows an output pulse of the frequency divider 31 which controls a gate circuit 16. Let us assume that the pulse outputs from the VCO 10 are counted for 1H period at a predetermined cycle. For the PAL system, the frequency counter 28 produces an output which is "LOW" at the rising of H pulse 7a as shown in FIG. 7c when the pulse count is 375 and the decoder 30 produces an LOW output as shown in FIG. 7d to open the gate by the output signal of the decoder 30 and the decoder 27 produces no output signal. When the pulse count is 376 or higher, the frequency counter 28 produces a HIGH output as shown in FIG. 7e at the rising of the H pulse 7a, the decoder 30 produces a HIGH output as shown in FIG. 7f for the next 1H period after the pulse counting and the frequency divider 29 produces a LOW output as shown in FIG. 7g. Thus, the decoder 27 opens its gate when the detection pulse from the decoder 30 is HIGH to produce a LOW signal and lower the oscillation frequency of the VCO 10. On the other hand, when the pulse count is 374 or lower, the frequency counter produces a HIGH output as shown in FIG. 7h at the rising of the H pulse 7a, the decoder 30 produces a HIGH output as shown in FIG. 7i during the next 1H period and the frequency divider 29 produces a HIGH output as shown in FIG. 7j. Thus, the decoder 27 produces a HIGH signal when the detection pulse from the decoder 30 is HIGH to raise the oscillation frequency of the VCO 10.

As will be explained later with reference to FIG. 12, for the NTSC system, the frequency counter 28 is modified such that the frequency counter 28 produces the outputs of 7c, 7e and 7h when the pulse count is 378 $f_H$, 379 $f_H$ or more, and 377 $f_H$ or less, respectively, to control the oscillation frequency of the VCO 10 in the same manner as that for the PAL system. While the pull-in in ranges of the VCO 10 by the frequency discriminator are equal for the PAL system and the NTSC system in the above explanation, it should be noted that the pull-in range for the NTSC system is expanded.

The count period of the frequency counter 28 is not limited to 1H but it may be an integer multiple of H. In this case, however, the capacity of the frequency counter increases as the count period increases.

Figure 8:
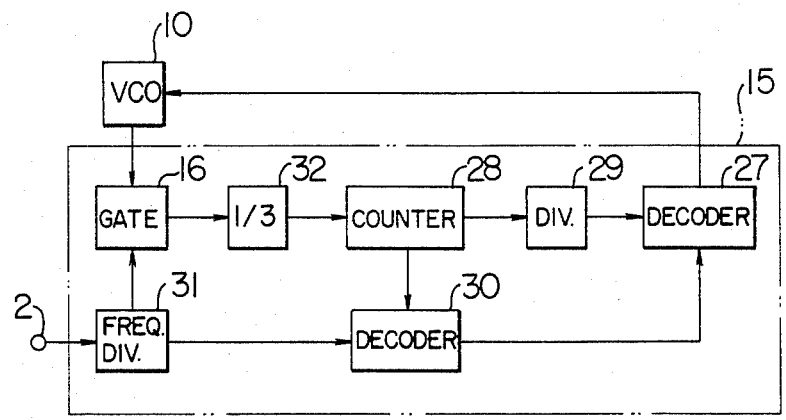
FIG. 8 shows a block diagram of another embodiment of the frequency discriminator of the present invention.

FIG. 8 shows another embodiment of the frequency discriminator 15 than that of FIG. 6. The present embodiment differs from FIG. 6 in that it frequency divides the output pulses e.g., 378 $f_H$ for the NTSC system, 375 $f_H$ for the PAL system from the VCO 10 by a frequency divider 32 by a factor of three and counts the counted-down output pulses by the frequency counter 28.

In FIG. 8, the count period of the output pulses of the VCO 10 must be selected to be 2H or longer, because if the output pulses of the VCO 10 counted-down by the factor of three are controlled in the manner shown in FIG. 6, an error of one pulse by the frequency counter 28 corresponds to an error of three pulses of the VCO 10 and the resulting pull-in range of the VCO 10 is $\pm 3$ $f_H$ which exceeds the range of $\pm 2$ $f_H$ required for the PAL system. Accordingly, it is necessary to select the count period to be 2H or longer to suppress the pull-in range of the VCO 10 for the PAL system within ±1.5 $f_H$.

When the count period is an integer multiple of 3H, the pulses in the count period are substantially in phase so that the pull-in range of the VCO 10 can be stabilized.

In the embodiment of FIG. 8, the number of high speed counters can be reduced because the input frequency to the frequency counter 28 is lower than that of the embodiment of FIG. 6. By selecting the frequency division factor of the frequency divider 32 to three, the frequency after count-down is an integer multiple of $f_H$ for both the NTSC system and the PAL system so that the frequency counter 28 can be used for both systems.

Figure 9:
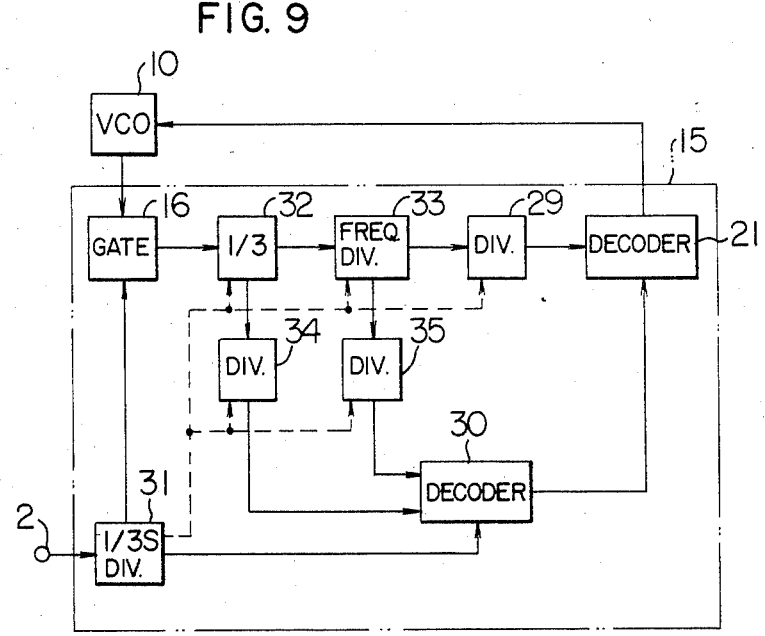
FIG. 9 shows a block diagram of other embodiment than those of FIGS. 6 and 8 of the present invention.

FIG. 9 shows another embodiment of the frequency discriminator of the present invention than the embodiments of FIGS. 6 and 8. The embodiment of FIG. 9 counts the output pulses of the VCO 10 by means of frequency dividers 32-35. By using the frequency counters 32 and 33 as frequency counters of an automatic frequency control circuit (AFC) for video recording, but not shown, the number of circuits can be reduced.

In FIG. 9, the center oscillation frequency of VCO 10 is 378 $f_H$ for the NTSC system and 375 $f_H$ for the PAL system. Numeral 32 denotes a one-to-three frequency divider, and numeral 33 denotes a 1-to-125 frequency divider for the PAL system and 1-to-126 frequency divider for the NTSC system. The frequency divider 31 frequency divides by a factor of 3S (where S is a positive even number), and the count period of the output pulses of the VCO 10 is selected to be 3/2 S.H.

Since a minimum phase difference of the frequency-divided pulses supplied to the decoder 30 from the frequency dividers 32-35 is determined by the one-to-three frequency divider 32, an error of one pulse in the decoder 30 corresponds to an error of three pulses in the VCO 10. Accordingly, in order to suppress the pull-in range of the VCO 10 within ±2 $f_H$, the count period must be 2H or longer. In the present embodiment, the output pulses of the VCO 10 frequency divided by the frequency dividers 32-35 are decoded by the decoder 30 to attain the same control characteristic of the frequency discriminator 15 as those of FIGS. 6 and 8. It is necessary that the phases of the frequency dividers 32-35 in the count period of the output pulses of the VCO 10 must be the same in each period. To this end, the count period of the output pulses of the VCO 10 is selected to be an integer multiple of 3H and the frequency division factor of the frequency divider 31 which divides the H pulses is selected to be 35 as described above. As a result, the pull-in range of the oscillation frequency of the VCO 10 for the PAL system is within ±$f_H$ and a satisfactory characteristic is attained. The pull-in range of the oscillation frequency of the VCO 10 by the frequency discriminator 15 for the NTSC system can be readily selected to be that shown in FIG. 5 by changing the frequency division factor of the frequency divider 33-35 for the PAL system and the NTSC system.

Broken lines in FIG. 9 show reset pulses to the frequency dividers 29 and 32-35 by the H pulses divided by the frequency divider 31.

Figure 10:
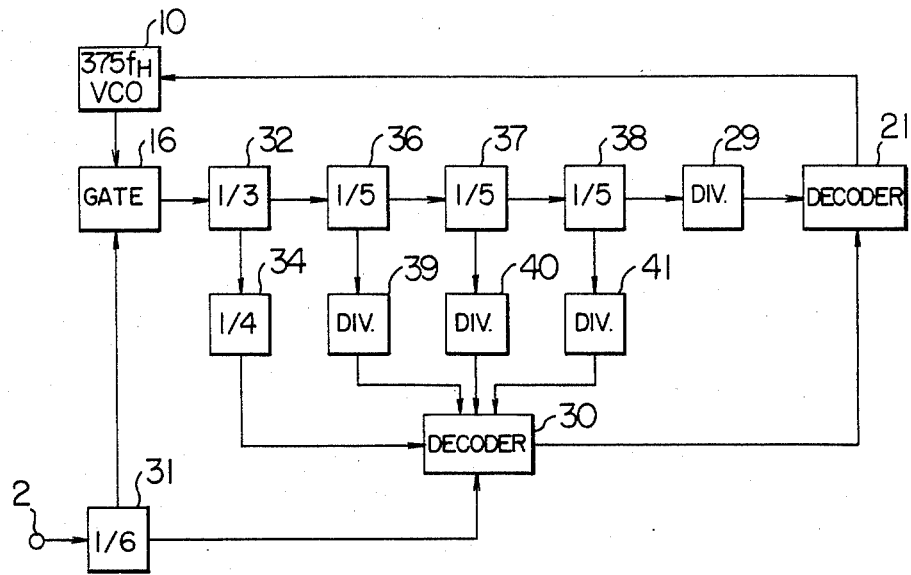
FIG. 10 shows a block diagram for the NTSC system of the embodiment of FIG. 9.
Figure 11:
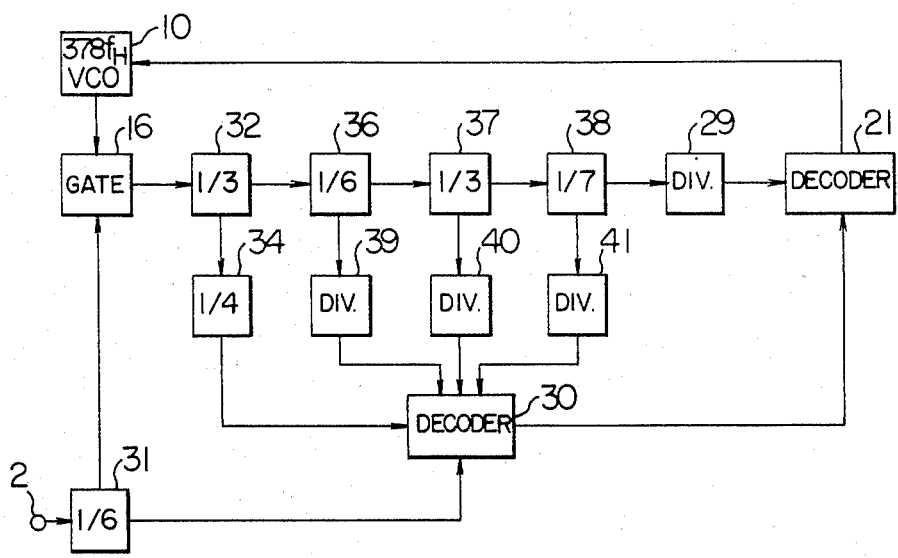
FIG. 11 shows a block diagram for the PAL system.

FIGS. 10 and 11 show embodiments of the circuit of FIG. 9 for the CCIR system and the NTSC system, respectively.

In FIGS. 10 and 11, numerals 36-46 denote frequency dividers. The frequency division factors of at least the frequency dividers 36-38 and the input/output pulses of the frequency dividers 39-41 are different for the PAL system and the NTSC system. In this embodiment the phases of the pulses supplied to the decoder 30 from the frequency divider 34 for the CCIR system and the NTSC system are different from each other by 90°degrees, because the frequency of the output pulse of the one-to-three frequency divider 32 is 125 $f_H$ for the PAL system and 126 $f_H$ for the NTSC system and there is a difference of 1 $f_H$ therebetween. By frequency dividing the pulses having the difference of 1 $f_H$ by means of the frequency divider 34 by the factor of four, a phase difference of 90 degrees corresponding to 1 $f_H$ is produced. By imparting the phase difference of 90 degrees between the output pulses of the frequency dividers 34 for the respective systems, the pull-in ranges of the oscillation frequencies of the VCO 10 for the respective systems are rendered equal.

It is possible to select the frequency division factor of the frequency divider 31 to be 12 and the count period of the pulses to be 6 H or 9 H.

When the frequency division factors of the frequency dividers 36-38 are selected to be 5, 5 and 5, respectively, for the PAL system and 6, 3 and 7 or 7, 3 and 6, respectively, for the NTSC system, the frequency dividers can be arranged in any sequence. Thus, the frequency dividers of the AFC in the recording circuit can be shared with the frequency dividers of the frequency discriminator so that the cost of the frequency divider is saved.

Figure 12:
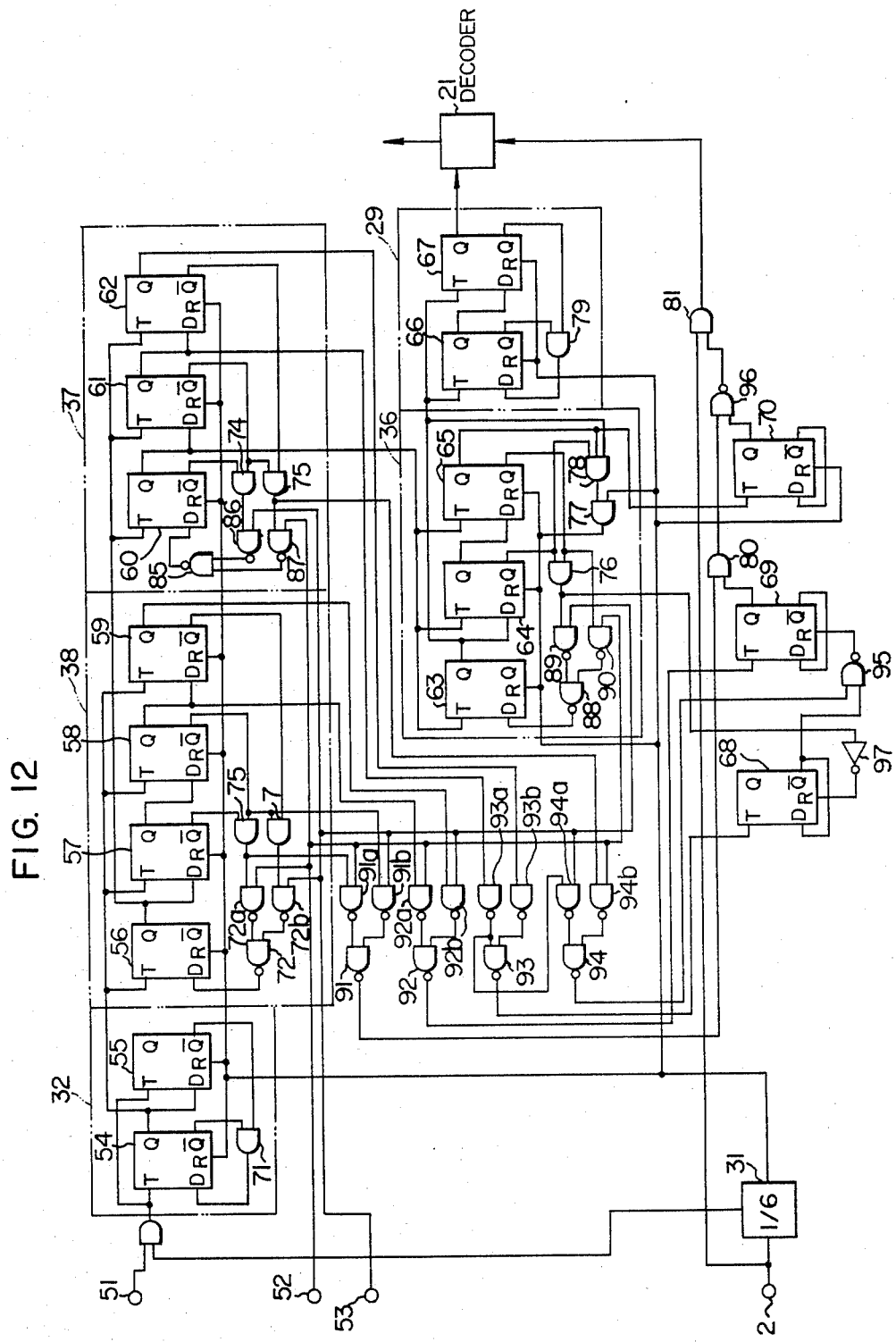
FIG. 12 shows a circuit diagram of an embodiment of an oscillation frequency switching unit of FIGS. 9 to 11.

FIG. 12 shows an embodiment of the playback frequency discriminator 15 in which the oscillation frequency of the VCO 10 is set to 378 $f_H$ for the NTSC system and 375 $f_H$ for the PAL system.

In FIG. 12, numeral 51 denotes an input terminal for the output signal from the VCO 10, numeral 52 denotes an input terminal for a control signal which is HIGH for the PAL system, numeral 53 denotes an input terminal for a control signal which is HIGH for the NTSC system, numerals 54-70 denote flip-flops, numerals 61-81 denote AND circuits, numerals 72-96 denote NAND circuits, and numeral 97 denotes an inverter. A block 32 encircled by a broken line is a one-to-three frequency divider, blocks 38, 37 and 36 are frequency dividers the frequency division factors of which are switched between 7 and 5, 3 and 5, and 6 and 5, respectively, for the NTSC system and the PAL system, respectively. Numeral 29 denotes a one-to-three frequency divider, numeral 31 denotes a frequency divider which divides a pulse having a period of $f_H$ from an input terminal 2 which is synchronized with a horizontal synchronizing signal, and numeral 21 denotes a decoder.

By switching the frequency division factors of the frequency dividers 36-38 by the control signals from the input terminals 52 and 53 and switching the input to the comparator which compares the phases of the signals at the frequency division output terminals, the oscillation frequency of the VCO 10 can be pulled into the frequency suitable for the NTSC system or the PAL system.

Figure 13:
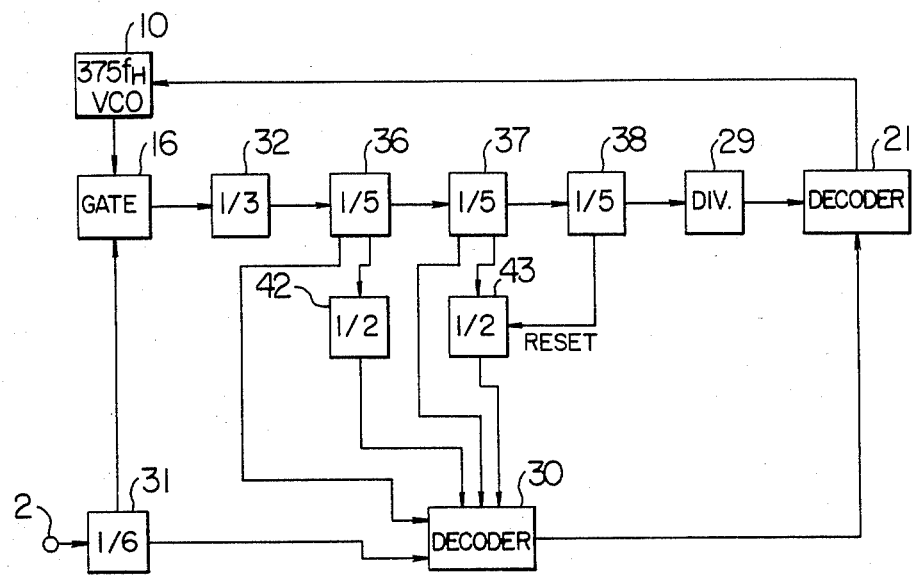
FIG. 13 shows a block diagram for the NTSC system of the embodiment of FIG. 9.
Figure 14:
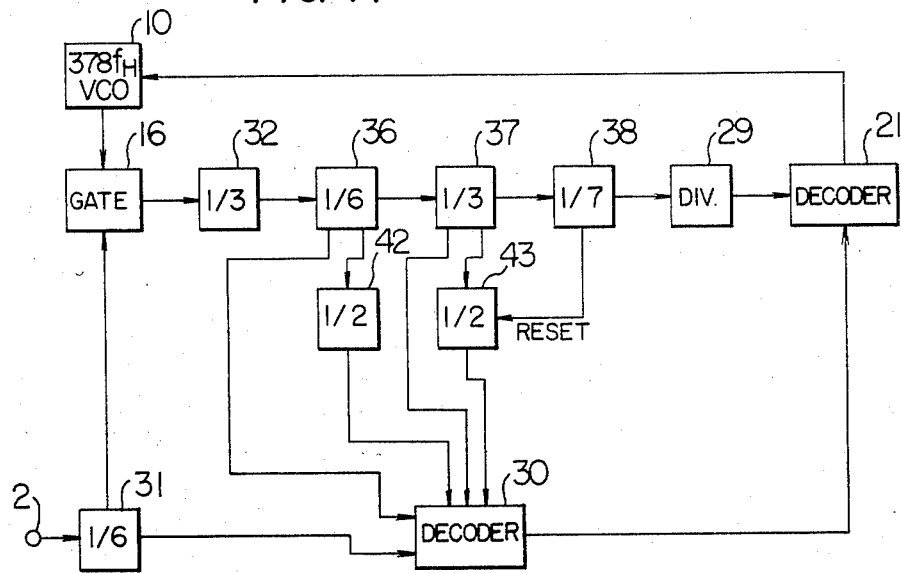
FIG. 14 shows a block diagram for the PAL system of the embodiment of FIG. 9, FIGS. 15a and 15b show control characteristics of the circuits of FIGS. 13 and 14.

FIGS. 13 and 14 show other embodiments of the circuit of FIG. 9 for the PAL system and the NTSC system, respectively.

In FIGS. 13 and 14, numerals 42 and 43 denote frequency dividers. Other numerals denote like elements to those of FIGS. 10 and 11. The present embodiments substantially reduce the number of frequency dividers as compared with the embodiments of FIGS. 10 and 11. Like the embodiments of FIGS. 10 and 11, the output signals of the frequency dividers 36-38 and the input-/output signals of the frequency dividers 42 and 43 are different for the PAL system and the NTSC system.

In the PAL system embodiment of FIG. 13, the width of the pulses divided by the frequency divider 32 by the factor of three is selected to the pull-in range of the oscillation frequency of the VCO 10 by the pulse having a duty factor of approximately 40 derived from the one-to-five frequency divider 36. In the NTSC system embodiment of FIG. 14, the width of the pulse counted down by the factor of three is selected to the pull-in range by the pulse having a duty factor of approximately 50% derived from the one-to-six frequency divider 36. The resulting control characteristics of the frequency discriminators are shown in FIGS. 15a and 15b. They satisfy the purpose of the present invention.

When the frequency dividers 36 and 38 are exchanged, the pulse width can be selected within the above pull-in range by the pulse having a duty factor of approximately 43 derived from the one-to-seven frequency divider 38, so that a control characteristic similar to those shown in FIGS. 15a and 15b is attained.

When the frequency dividers 36 and 38 are exchanged, the pulse width can be selected within the above pull-in range by the pulse having a duty factor of approximately 57% derived from the one-to-seven frequency divider, so that the pull-in range for the NTSC system is selected to be twice as wide as that for the PAL system. FIG. 12 illustrates an example for implementing such a case.

Figure 16:
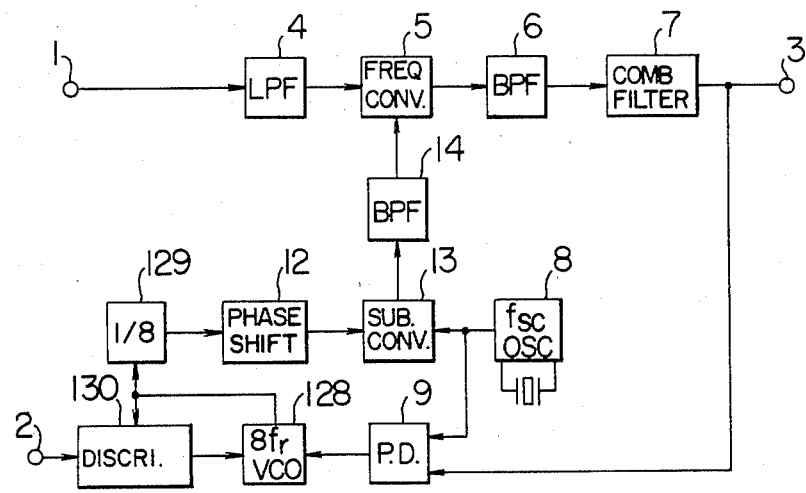
FIG. 16 shows a block diagram of one embodiment of a color signal playback circuit of the present invention.

FIG. 16 shows a block diagram of one embodiment of the color signal playback circuit of the present invention. In the present embodiment, unlike the prior art shown in FIG. 1, an oscillation frequency of a VCO 128 controlled by a frequency discriminator 130 is 8 $f_r$ which is eight times as high as a low frequency converted color sub-carrier frequency $f_r$, and an output signal of the VCO 128 is frequency divided by a frequency divider 129 by a factor of eight. In the present embodiment, a signal of the low frequency converted color sub-carrier frequency $f_r$ is produced at the output of a phase shifter 12 as is done in the prior art of FIG. 1 so that a normal color signal can be reproduced.

The reason for the selection of the oscillation frequency of the VCO 128 as 8 $f_r$ ($f_r$ is the low frequency converted color sub-carrier frequency) is explained below.

As described above, in the video tape recorder, in order to visually reduce the beat disturbance due to the secondary distortion of the low frequency converted color signal $f_r$, the low frequency converted color sub-carrier frequency $f_r$ is imparted with the offset, which is $f_H/4$ for the NTSC system and $f_H/8$ or 3 $f_H/8$ for the PAL system. Thus, the low frequency converted color sub-carrier frequency $f_r$ is selected to be $(u\pm\frac{1}{4})\,f_H$ for the NTSC system, and $(v\pm\frac{1}{8})\,f_H$ or $(v\pm\frac{3}{8})\,f_H$ for the PAL system (where u and v are integers). Accordingly, by selecting the oscillation frequency $f_{VCO}$ of the VCO 128 of FIG. 16 to be the low frequency converted color sub-carrier frequency $f_r$ times 4P for the NTSC system and $f_r$ times 8 Q for the PAL system (where P and Q are integers) and selecting the frequency division factor of the frequency divider 129 to be $\frac{1}{4}$P for the NTSC system and $\frac{1}{8}$Q for the PAL system, the signals of the low frequency converted color sub-carrier frequency $f_r$ having the offsets described above are produced at the output of the frequency divider 129. By selecting the oscillation frequency $f_{VCO}$ of the VCO 128 to be eight times that of the low frequency converted color sub-carrier frequency $f_r$ in the present embodiment, the above conditions for the NTSC system and the PAL system are met and the VCO 128 and the frequency divider 129 can be used for both the NTSC system and the CCIR system.

Figure 17:
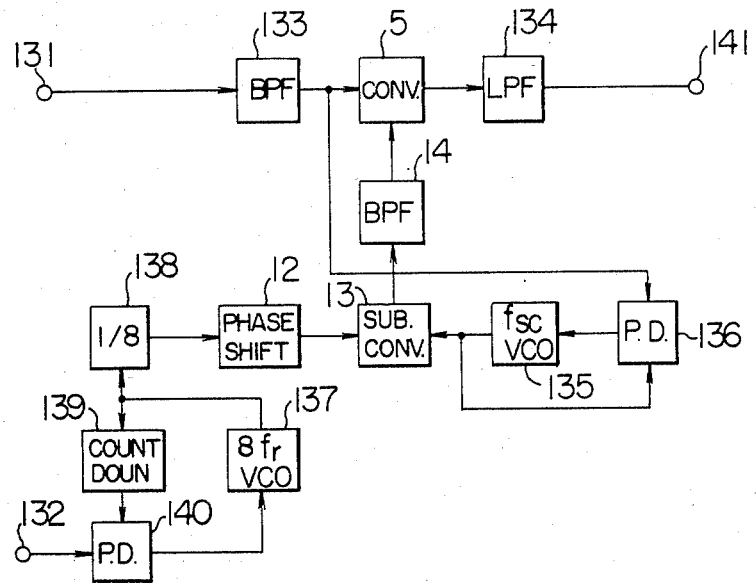
FIG. 17 shows a block diagram of one embodiment of a color signal recording circuit of the present invention.

By selecting the oscillation frequency $f_{VCO}$ of the VCO 128 to be eight times that of the low frequency converted color sub-carrier frequency $f_r$ as described above, the oscillation frequency $f_{VCO}$ of the VCO 128 is an integer multiple of the horizontal synchronizing frequency $f_H$ and the VCO 128 can be shared with a VCO used in a color signal recording circuit which converts the color signal to a low frequency signal. FIG. 17 shows a block diagram of one embodiment of the color signal recording circuit which converts the color signal fS to the low frequency converted carrier $f_r$ of $(u\pm\frac{1}{4})\,f_H$ for the NTSC system and $(v\pm\frac{1}{8})\,f_H$ or $(v\pm\frac{3}{8})\,f_H$ for the PAL system. The color signal of the color sub-carrier frequency fS extracted from the color video signal applied to an input terminal 131 is supplied to a BPF 133, an output of which is converted to the color signal of the low-frequency color sub-carrier frequency $f_r$ by a first frequency converter 5, an output of which is supplied to an output terminal 141 through an LPF 134. On the other hand, a conversion carrier $(f_{sc}+f_r)$ supplied to the first frequency converter 5 from a BPF 14 is produced by modulating an output signal of a VCO 135 having the oscillation frequency $f_{sc}$ and an output signal of a phase shifter 12 having the frequency $f_r$ by a second frequency converter 13. The VCO 135 and a phase detector 136 form an APC loop and the output signal of the VCO 135 is phase-locked to the sub-carrier frequency fS of the unconverted color signal. A VCO 137, a frequency divider 139 and a phase detector 140 form an automatic frequency control (AFC) loop and the oscillation frequency of the VCO 137 is locked to an integer multiple of the horizontal synchronizing pulse frequency $f_H$ from an input terminal 132 so that a normal low frequency converted color signal is produced at the output terminal 141. By selecting the oscillation frequency $f_{VCO}$ of the VCO 137 to be eight times that of the low frequency converted color sub-carrier frequency $f_r$ and by selecting the frequency division factor of the frequency divider 138 to be eight, the signal of the frequency $f_r$ is produced at the output of the phase shifter 12 as is produced in FIG. 16. The oscillation frequency $f_{VCO}$ of the VCO 137 is an integer multiple of $f_H$ ($(8u\pm2)\,f_H$ for the NTSC system and $(8v\pm1)\,f_H$ or $(8v\pm3)\,f_H$ for the PAL system) so that the AFC loop can be formed. As a result, the VCO 128 in the color signal playback circuit of FIG. 16 can be shared with the VCO 137 in the color recording circuit of FIG. 17. In the present embodiment, by selecting the oscillation frequency of the VCO 128 which is a source to the low frequency converted color sub-carrier $f_r$ applied to the second frequency converter 13 of FIG. 16 to be 8 $f_r$, the VCO 128 and the frequency divider 129 can be used for both the NTSC system and the PAL system, and can be shared by the VCO 137 and the frequency divider 138 in the color signal recording circuit of FIG. 17. As a result, the construction of the color signal processing circuit of the video tape recorder is simplified and the cost is reduced.

Another feature in the color signal circuit of FIG. 16 resides in the selection of the oscillation frequency of the VCO 128 to be the horizontal synchronizing frequency $f_H$ times 3N (where N is an integer). The reason therefor is explained below.

Figure 2:
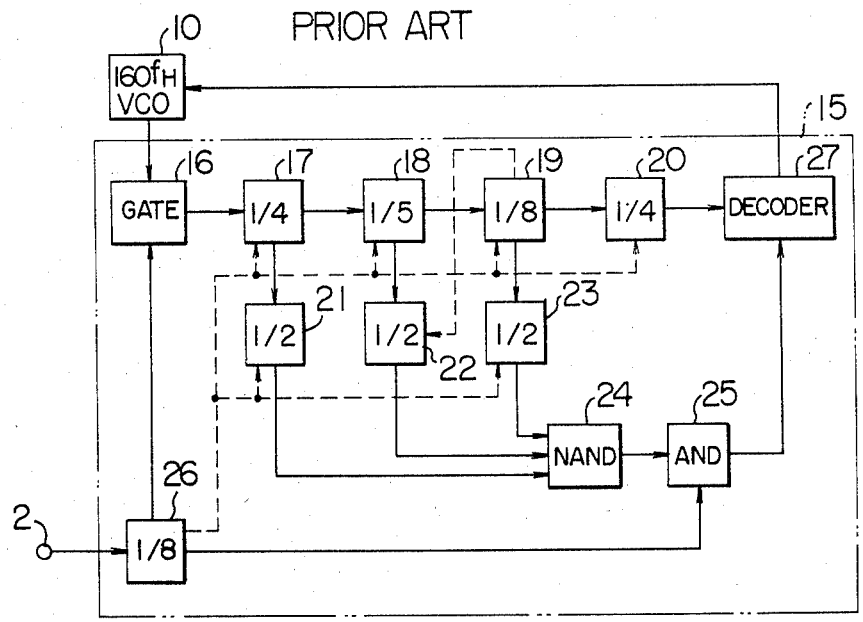
FIG. 2 shows a block diagram of a frequency discriminator used in the prior art color signal playback circuit.
Figure 3:
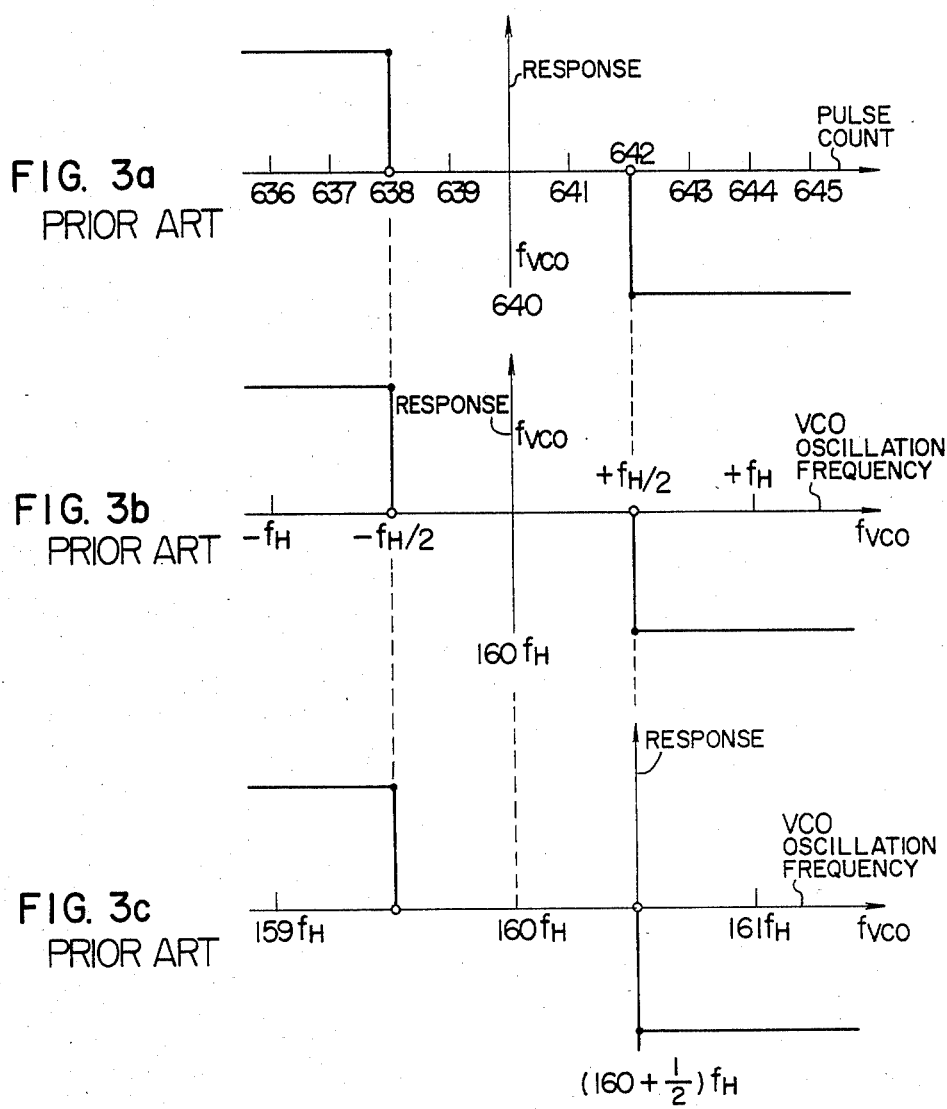
FIGS. 3a to 3c show a control characteristic of the prior art frequency discriminator and a pull-in range characteristic of an oscillation frequency of a VCO controlled by the frequency discriminator.

The low frequency converted color sub-carrier frequency $f_r$ is usually selected to vicinity of 700 KHz in view of the band of the color signal (approximately ±500 KHz) and the frequency characteristic (degradation of low frequency playback characteristic) of the tape head system. Accordingly, by selecting the oscillation frequency $f_{VCO}$ of the VCO 128 of FIG. 16 to be eight times that of the low frequency converted color sub-carrier frequency $f_r$ as described above, the frequency $f_{VCO}$ is nearly equal to 6 MHz. A frequency discriminator 130 which detects the oscillation frequency $f_{VCO}$ of the VCO 128 and controls the frequency $f_{VCO}$ is constructed by the counter and the decoder as shown by the block 15 of FIG. 2. Accordingly, a flip-flop (FF) of the frequency divider which directly counts down the output signal of the VCO 128 must operate at a high speed of approximately 6 MHz. However, when the flip-flop is operated at the high speed, the power consumption increases, and the chip size increases. From the view point of the power consumption and the chip size, it is desirable to minimize the number of high speed flip-flops. In addition, when the oscillation frequency $f_{VCO}$ of the VCO 128 is changed for the NTSC system and the PAL system by changing the number of counter stages of the frequency divider 130 and the decoder for both systems to allow the VCO 128 to be shared by the both system, it is desirable that the high speed frequency divider is shared by both systems. As a result, the power consumption and the increase of the chip size are suppressed. On the other hand, by selecting the oscillation frequency $f_{VCO}$ of the VCO 128 to be eight times that of the low frequency converted color sub-carrier frequency $f_r$ as described above, the oscillation frequency $f_{VCO}$ is $(8u\pm2) f_H$ for the NTSC system and $(8v\pm1) f_H$ or $(8v\pm3) f_H$ for the PAL system. FIG. 18 shows difference frequencies of the oscillation frequencies $f_{VCO}$ for the NTSC system and the PAL system with (u - v) being a parameter. When the high speed frequency counter which directly counts down the output signal of the VCO 128 is shared by the NTSC system and the PAL system as described above, the frequency division factor of the high speed frequency divider is selected such that it can count the difference frequency shown in FIG. 18. In order to minimize the number of high speed flip-flops, it is desirable that the difference frequency is a minimum possible prime number other than one. From those two requirements, a preferable frequency division factor of the high speed frequency divider is three. In the present embodiment, the oscillation frequency $f_{VCO}$ of the VCO 128 of FIG. 16 is selected to be an integer multiple of 3 $f_H$ for the both systems to satisfy the above requirements. Thus, according to the present invention, the VCO 128 can be used for both systems, the number of high speed frequency dividers is minimized since the frequency dividers are used for the both systems and the power consumption and the chip size are minimized.

Figure 19:
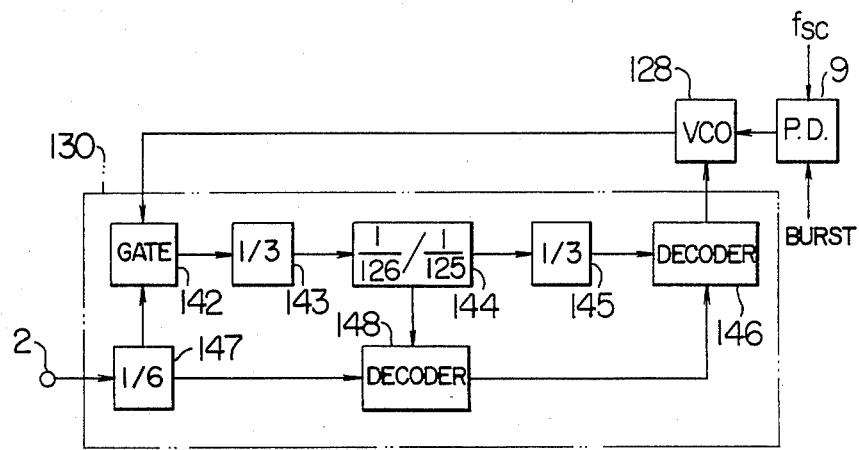
FIG. 19 shows a block diagram of one embodiment of the frequency discriminator of the color signal playback circuit of the present invention.

FIG. 19 shows one embodiment of the VCO 128 having the oscillation frequency $f_{VCO}$ selected to satisfy the above requirement and the frequency discriminator 130.

In the embodiment of FIG. 19, the oscillation frequency of the VCO 128 is selected to be 378 $f_H$ for the NTSC system and 375 $f_H$ for the PAL system. Numeral 142 denotes a gate circuit which limits the count period for the output signal of the VCO 128. Numeral 143 denotes a one-to-three frequency divider, numerals 144 and 145 denote frequency dividers, numeral 146 denotes a decoder which produces a control signal for the oscillation frequency $f_{VCO}$ of the VCO 128, numeral 147 denotes a frequency divider, and numeral 148 denotes a decoder which produces a pulse in response to detection of an error in the oscillation frequency $f_{VCO}$ of the VCO 128. The frequency division factor of the frequency divider 144 may be switched in the same manner as shown in FIG. 12.

Figure 20:
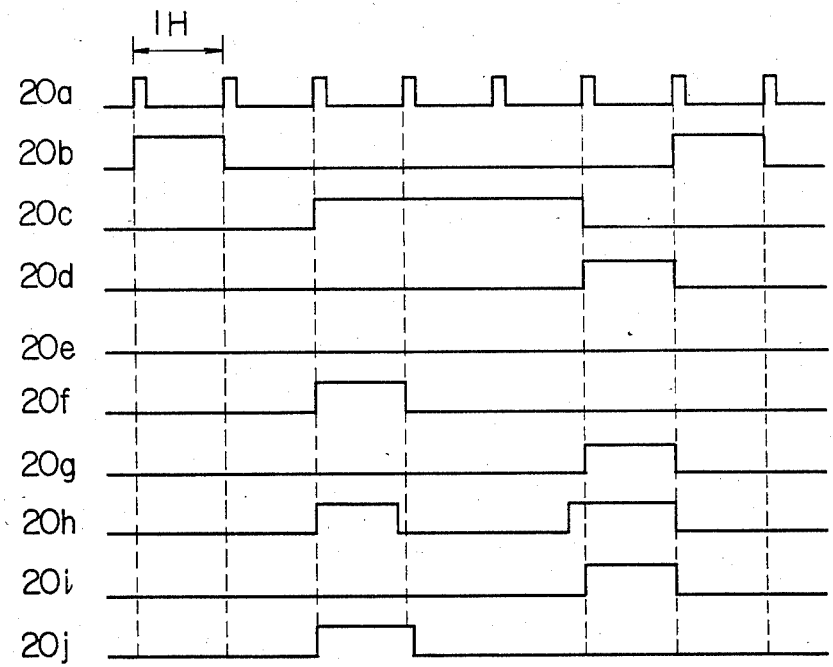
FIGS. 20a–20j show a time chart for explaining an operation of the circuit of FIG. 19, FIGS. 21a to 21c show control characteristics of the frequency discriminator of the color signal processing circuit of the present invention.

FIG. 20 shows a time chart of the operation of the circuit of FIG. 19. The operation of the circuit of FIG. 19 is now explained with reference to the time chart.

In FIG. 20, numeral 20a denotes a horizontal synchronizing pulse from an input terminal 2, and numerals 20b, 20c and 20d denote pulses derived by decoding the one-to-six frequency divided horizontal synchronizing pulse 20a at respective timings. Numeral 20b denotes a reset pulse for resetting the frequency dividers 143, 144 and 145. Numeral 20c denotes a gate pulse supplied from the frequency divider 147 to the gate circuit 142. Numeral 20d denotes a pulse for timing detection of a frequency error, which is supplied from the frequency divider 147 to the decoder 148. The frequency dividers 143, 144 and 145 and the decoders 146 and 148 are reset by the pulse 20b in a first 1H-period of a 6H-period. The second 1H-period is made free, and the gate circuit 142 is opened by the 3H-period pulse 20c from the beginning of the third 1H-period so that the output signal of the VCO 128 is supplied to the frequency divider 143. The output signal of the VCO 128 is counted down by a factor of three by the frequency divider 143 and the frequency-divided signal is supplied to the frequency divider 144 which counts down the pulses during the 3H-period. An error in the pulse count of the frequency divider 144 which counts down the output signal from the VCO 128 by the factor of three for the 3H-period is detected by the decoders 146 and 148 in response to the sixth 1H-period pulse 20d. In the seventh 1H-period, the frequency dividers 143, 144 and 145 and the decoders 146 and 148 are again reset and the above operations are repeated.

Figure 21A:
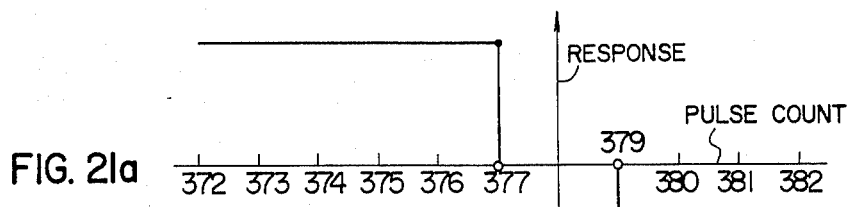

In the NTSC system, assuming that the oscillation frequency $f_{VCO}$ of the VCO 128 is 378 $f_H$ as described above, the frequency division factor of the frequency divider 144 is 126 $f_H$ and the output signal frequency from the one-to-three frequency divider 143 is 126 $f_H$. The counted-down pulses are counted for the 3H-period to check if the pulse count is equal to $126\times3=378$. If the pulse count is 378, the decoder 148 produces a LOW output signal 20e and a pulse indicating an oscillation frequency error of the VCO 128 is not produced. The frequency division factor of the frequency divider 145 is selected to be three and the frequency divider 145 counts down the pulses from the frequency divider 144 which frequency-divides the output signal of the VCO 128 by the factor of 378. Thus, the frequency divider 145 produces an output signal 20f. On the other hand, if the pulse count is for example 379 or larger, the decoder 148 produces an output signal 20g and a pulse indicating the frequency error of the VCO 128 is produced in the sixth 1H-period. The output signal from the frequency divider is HIGH in the sixth 1H-period as shown by 20h to indicate that the oscillation frequency of the VCO 128 is 378 $f_H$ or higher. If the pulse count is 377 or lower, the decoder 148 produces an output signal 20i and a pulse indicating the oscillation frequency error of the VCO 128 is produced in the sixth 1H-period. The frequency divider 145 produces an output signal 20i which is LOW in the sixth 1H-period to indicate that the oscillation frequency of the VCO 128 is 377 $f_H$ or lower. A control characteristic of the frequency discriminator 130 which controls the oscillation frequency $f_{VCO}$ of the VCO 128 is shown in FIG. 21a. By converting the control characteristic to the frequency pull-in range of the oscillation frequency $f_{VCO}$ of the VCO 128, it is equivalent to a product of the pulse count and the horizontal synchronizing frequency $f_H$.

Figure 21B:
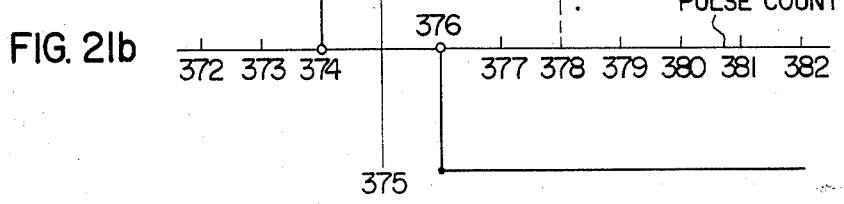

In the PAL system, assuming that the oscillation frequency $f_{VCO}$ of the VCO 128 is 375 $f_H$, the frequency division factor of the frequency divider 144 is 125 and the output frequency from the one-to-three frequency divider 143 is 125 $f_H$. The counted-down pulses are counted for the 3H-period of the 6H-period to check if the pulse count is equal to $125 \times 3 = 375$, in the same manner as for the NTSC system. A control characteristic of the frequency discriminator 130 is shown in FIG. 21b. The control characteristic can be converted to the pull-in range of the oscillation frequency $f_{VCO}$ of the VCO 130 by multiplying the horizontal synchronizing frequency $f_H$ by the pulse count in the same manner as described above.

As discussed above, the frequency discriminator 130 of FIG. 19 in the present embodiment is characterized by:
(1) the detection period of the oscillation frequency $f_{VCO}$ of the VCO 128 is the 3H-period of the 6H-period,
(2) the oscillation frequency $f_{VCO}$ of the VCO 128 is detected based on the pulses after being counted down by the factor of three, and
(3) the pull-in range of the oscillation frequency $f_{VCO}$ of the VCO 128 by the frequency discriminator 130 is selected to be $\pm f_H$.

The above features are now explained.

Figure 21C:
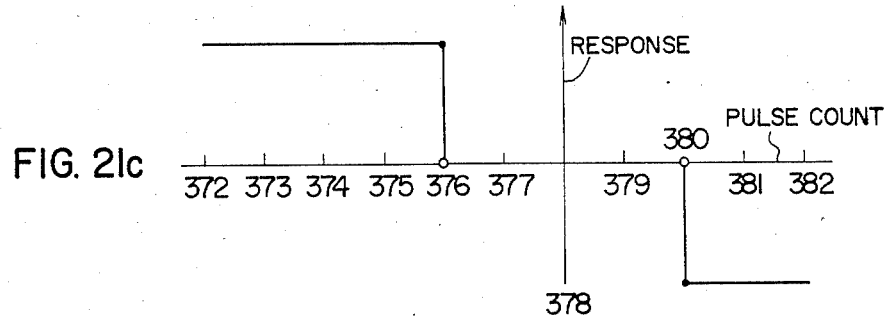

By setting the detection period of the oscillation frequency $f_{VCO}$ of the VCO 128 to 3H, as described in (1) above, the center frequency of the oscillation frequency $f_{VCO}$ of the VCO 128 can be detected by the frequency disciminator 130 as an integer pulse count and it can be set to the center of the frequency pull-in range of the VCO 128 as shown in FIGS. 21a to 21c, because the oscillation frequency $f_{VCO}$ of the VCO 128 is an integer multiple of 3 $f_H$. The detection period for satisfying the above requirement is not only 3H but also it may be an integer multiple of 3H. When the detection period of the oscillation frequency $f_{VCO}$ of the VCO 128 is 6H, a variation of input phase of the output signal of the VCO 128 to the gate circuit 142 is suppressed and a mulfunction of the frequency discriminator 130 is also suppressed, because the oscillation frequency $f_{VCO}$ of the VCO 128 is the integer multiple of 3 $f_H$, as described above. The detection period for satisfying the above requirement is not only 6H but also it may be a period which is longer than the detection period and an integer multiple of 3H. Accordingly, in FIG. 19, the frequency division factor of the frequency divider 147 may be twelve instead of six, the detection period may be 12H and the detection period of the oscillation frequency $f_{VCO}$ of the VCO 128 may be 6H.

By detecting the oscillation frequency f of the VCO 128 by the frequency discriminator 130 based on the pulses counted down by the factor of three as described in (2) above, the pulse count detection can be effected in a low frequency region. As a result, an error of the pulse count in the detection circuit due to delay in the flip-flops can be suppressed. The switching between the NTSC system and the PAL system can be readily attained by switching the frequency division factor of the low frequency frequency divider and an error due to the switching of the frequency division factor is also suppressed. In the embodiment of FIG. 19, the gate circuit 142 is arranged in the preceding stage to the one-to-three frequency divider 143 so that the phase variation of the input signal to the gate circuit 142 is minimized. On the other hand, the gate circuit 142 must be of a high speed type. By arranging the gate circuit 142 in the succeeding stage to the one-to-three frequency divider 143, the operation frequency of the gate ciruict 142 can be reduced to one third.

By selecting the pull-in range of the oscillation frequency $f_{VCO}$ of the VCO 128 by means of the frequency discriminator 130 to be $\pm f_H$ as described in (3) above, the compensation range for the jitter component $\Delta f$ by the APC for the NTSC system and the PAL system can be set within $\pm f_H/8$ around the color sub-carrier frequency $f_{sc}$ so that the jitter compensation error by the APC can be satisfactorily suppressed. For the NTSC system, the compensation range for the jitter component $\Delta f$ by the APC is $\pm f_H/2$. Accordingly, taking a margin of 6 dB into consideration it may be smaller than $\pm f_H/4$. Thus, the control characteristic of the frequency discriminator 130 may be set as shown in FIG. 21c and the pull-in range of the oscillation frequency $f_{VCO}$ of the VCO 128 may be selected to be $\pm 2 f_H$. When the detection period of the oscillation frequency $f_{VCO}$ of the VCO 128 by the frequency discriminator 130 is not 3H but 6H, the pull-in range of the oscillation frequency $f_{VCO}$ of the VCO 128 may be equal to or smaller than $\pm 2 f_H$ for the NTSC system and equal to or smaller than $\pm f_H$ for the PAL system under a margin of 6 dB, where the number of pulses to be counted becomes double.

In the embodiment of the frequency discriminator 130 of the color signal playback circuit of the present invention, the oscillation frequency of the VCO 128 controlled by the frequency discriminator 130 is selected to be 378 $f_H$ for the NTSC system and 375 $f_H$ for the PAL system. However, the oscillation frequency is not limited to those frequencies but other frequencies may be used so long as the oscillation frequencies of the VCO 128 for the NTSC system and the PAL system are integer multiples of 3 $f_H$ and a difference frequency therebetween is also an integer multiple of 3 $f_H$. For example, it may be 378 $f_H$ for the NTSC system and 381 $f_H$ for the PAL system. In this case, the frequency division factor of the frequency divider 144 of FIG. 19 is changed and the center frequency of the control characteristic by the frequency discriminator 130 shown in FIGS. 21a to 21c also changes with the oscillation frequency $f_{VCO}$ of the VCO 128.

A circuit suitable to record the color signal of the NTSC system on a video tape is shown in Japanese Patent Application No. 57-37994. The frequency of the color signal to be recorded on the tape is selected to be N.3 $f_H$ (where N is an integer) and the frequency of the low frequency converted color signal is selected to be as high as 700 kHz.

Figure 22:
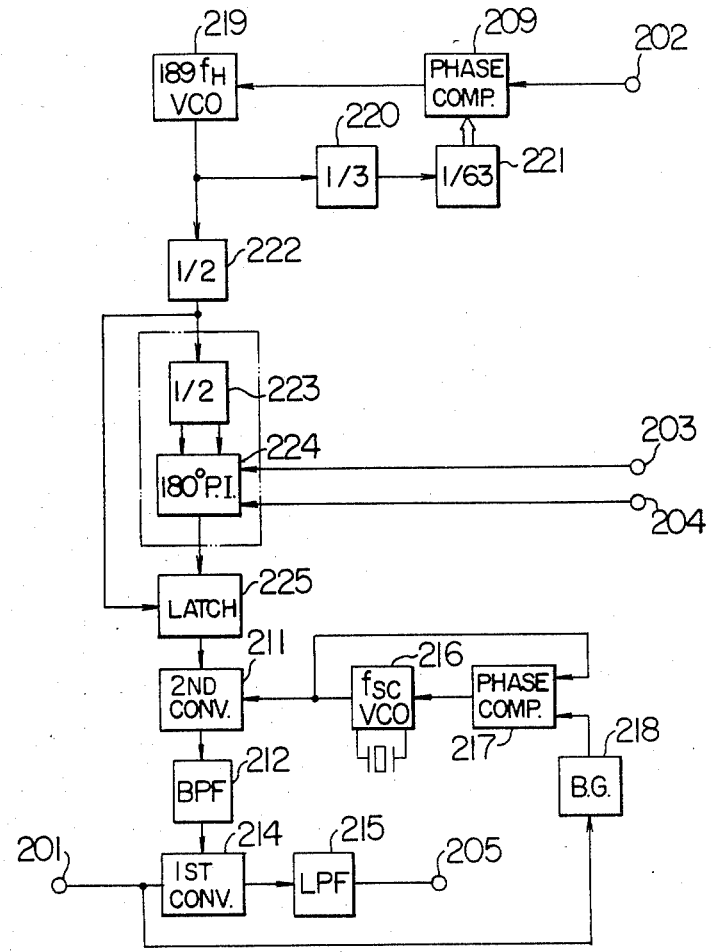
FIG. 22 shows a block diagram of other embodiment of the present invention.

FIG. 22 shows one embodiment of the circuit for recording the color signal of the NTSC system. In FIG. 22, numeral 219 denotes a VCO which oscillates at 189 $f_H$, numeral 220 denotes a one-to-three frequency divider, numeral 221 denotes a 1-to-63 frequency divider, numerals 222 and 223 denote one-to-two frequency dividers, numeral 224 denotes a phase inverter, numeral 225 denotes a latch circuit for connecting a phase shift of an output from the phase inverter 224, and other numerals denote like elements shown in FIG. 4. The circuit operation is essentially the same as that of FIG. 4. The output signal from the VCO 219 which is phase-synchronized with the horizontal synchronizing signal from the input terminal 202 is frequency divided by the two one-to-two frequency dividers 222 and 223 by the factor of four and two signals having a frequency of $(47+\frac{1}{4}) f_H$ and a phase difference of 180 degrees therebetween are supplied to the phase inverter 224. In one field period or one track period, a low frequency carrier having a frequency of $(47+\frac{1}{4}\pm\frac{1}{2}) f_H$ with the phase thereof switched by 180 degrees for every 1H period is supplied to the second frequency converter 211 through the latch circuit 225, and in the other track period a low frequency carrier having a frequency of $(47+\frac{1}{4}) f_H$ with the phase thereof fixed is supplied to the second frequency converter 211. The output signal $f_{sc}$ of the crystal VCO 216 is combined with the input signal to the second frequency converter 211 so that it produces sum frequency signals of $\{3.58 \text{ MHz}+(47+\frac{1}{4}) f_H\}$ and $\{3.58 \text{ MHz}+(47+\frac{1}{4}\pm\frac{1}{2}) f_H\}$, which are then supplied to the first frequency converter 214. Accordingly, the low frequency converted color signal at the output terminal 205 is $(47+\frac{1}{4}) f_H$ in the one track period and $(47+\frac{1}{4}\pm\frac{1}{2}) f_H$ in the other track period. Thus, they have an offset of $f_H/2$ between the track, as is the case in the prior art circuit of FIG. 4, and are then recorded on the respective video tracks.

The present embodiment is featured in that the phase inverter 224 is arranged in the preceding stage to the second frequency converter 211 and the signal which is not reset but phase reversed for each 1H period by the phase inverter 224 and the signal which is not phase-reversed are switched for each field or track to define the position at which the color signal to be recorded on the tape is phase-reversed.

The above features of the present embodiment are explained in detail. As shown in FIG. 22, by arranging the phase inverter 224 in the preceding stage to the record frequency converter 211, 180-degree phase reversal is effected at the low frequency of approximately 750 kHz and the shift of the phase reversal angle from 180 degrees can be suppressed so that the degradation of the cross-talk suppression effect for the color signal can be prevented. As a result, the quality of the playback image is improved.

Further, by arranging the phase inverter 224 in the preceding stage to the second frequency converter 211, the phase inverter 224 may be constructed by a digital circuit and it can be readily incorporated in an IC module with the frequency dividers 222 and 223. By predefining the position at which the color signal to be recorded on the tape is phase-reversed, a phase compensation error of the color signal at the playback head switching point in the playback mode can be predicted to some extent so that the color response is fastened. In a special playback mode, for example, a search playback mode, the phase compensation error of the color signal at a track jump point of the playback head can be predicted so that the color response in the special playback mode is fastened and the image quality is improved.

Figure 23:
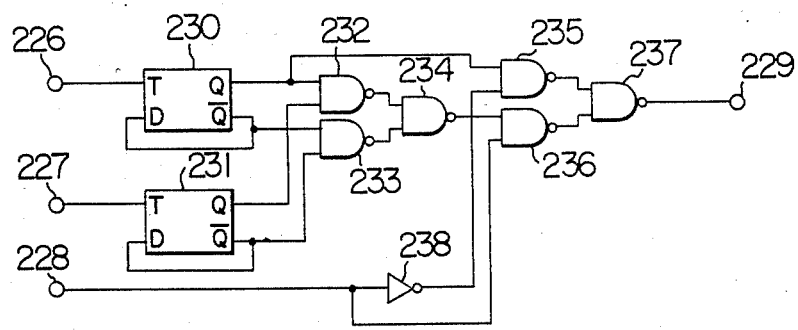
FIG. 23 shows a circuit diagram of one embodiment of a phase inverter of the present invention.
Figure 24:
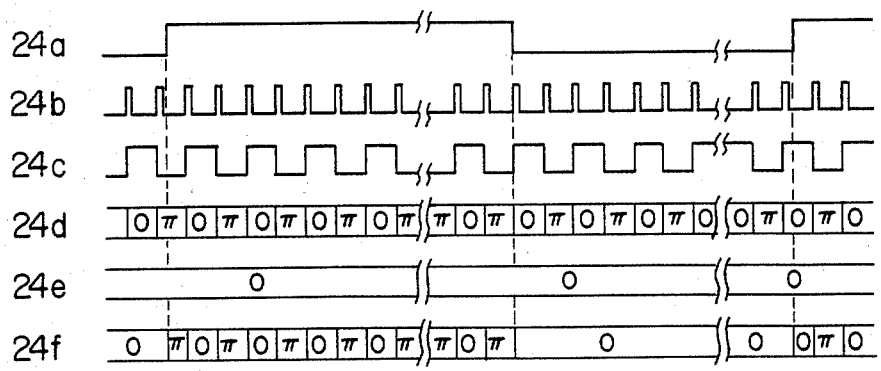
FIGS. 24a–24f show waveforms for explaining an operation of the circuit of FIG. 23.

FIG. 23 shows one embodiment of the one-to-two frequency divider 223 and the phase inverter 224 encircled by broken lines in FIG. 22. In FIG. 23, numeral 226 denotes an input terminal for a one-to-two frequency divided signal from the 189 $f_H$ VCO 219 of FIG. 22, numeral 227 denotes an input terminal for the horizontal synchronizing signal or a signal synchronized therewith, numeral 228 denotes an input terminal for a signal indicating the first track or the second track, numeral 229 denotes an output terminal of the phase inverter 224, numerals 230 and 231 denote flip-flops, numerals 232–237 denote NAND circuits and numeral 238 denotes an inverter. FIG. 24 shows a timing chart for explaining the operation of FIG. 23. The signal of the frequency of 189 fH/2 from the input terminal 226 is one-to-two frequency divided by the flip-flop 230, which producs a Q-output of $(47+\frac{1}{4}) f_H$ which is supplied to the NAND 232 and a $\overline{Q}$-output of opposite phase which is supplied to the NAND 233. On the other hand, a horizontal synchronizing signal 24b is supplied from the input terminal 227 to the flip-flop 231, which produces at a Q-output a signal 24c which phase-reverses for each 1H period, which signal is supplied to the NAND 232. A signal having the opposite phase to the signal 24c is produced at a $\overline{Q}$ output and it is supplied to the NAND 233. Accordingly, assuming that the phase of the Q-output of the flip-flop 230 is O and the phase of the $\overline{Q}$-output is $\pi$, the signal 24d which has the frequency of $(47+\frac{1}{4}) f_H$ and has the phase reversed for each 1H-period is produced at the output of the NAND 234. The signal 24d which phase-reverses for each 1H-period is supplied to the NAND 236 and the Q-output 24e of the flip-flop 230 is supplied to the NAND 235, the track signal 24a from the input terminal 228 is supplied to the NAND 236 and the phase-inverted track signal 24a is supplied to the NAND 235. The signals 24d and 24e are switched for each track. As a result, a signal 24f which has the phase O in the first track and the phase which is reversed for each 1H-period in the second track is produced.

Figure 25:
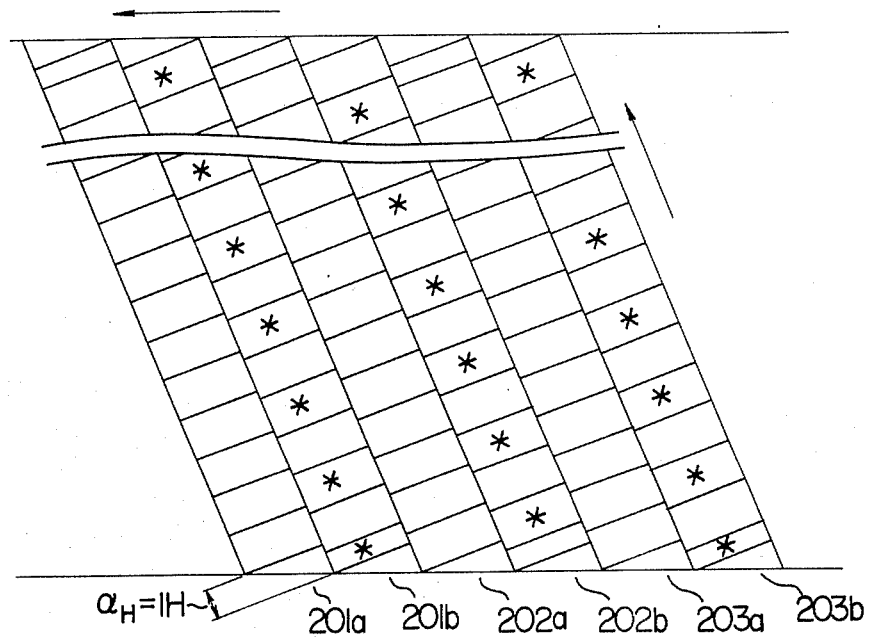
FIG. 25 shows a recorded tape pattern in a color signal recording system of the present invention.

An example of a tape pattern recorded by converting the color signal to a low frequency by the low frequency carrier thus produced is shown in FIG. 25.

In FIG. 25, a deviation $\alpha$H of H between adjacent tracks is 1H, each block shows a 1H-period and the mark * represents a phase reversal point. The non-phase reversal low frequency converted color signal of phase O is recorded in the first tracks (201a, 202a, 203a, ... ) and the low frequency converted color signal having the phase reversed for each 1H-period is recorded on the second tracks (201b, 202b, 203b, ... ) with the phases of the adjacent second tracks (e.g. 201b and 202b) being opposite to each other.

Figure 26:
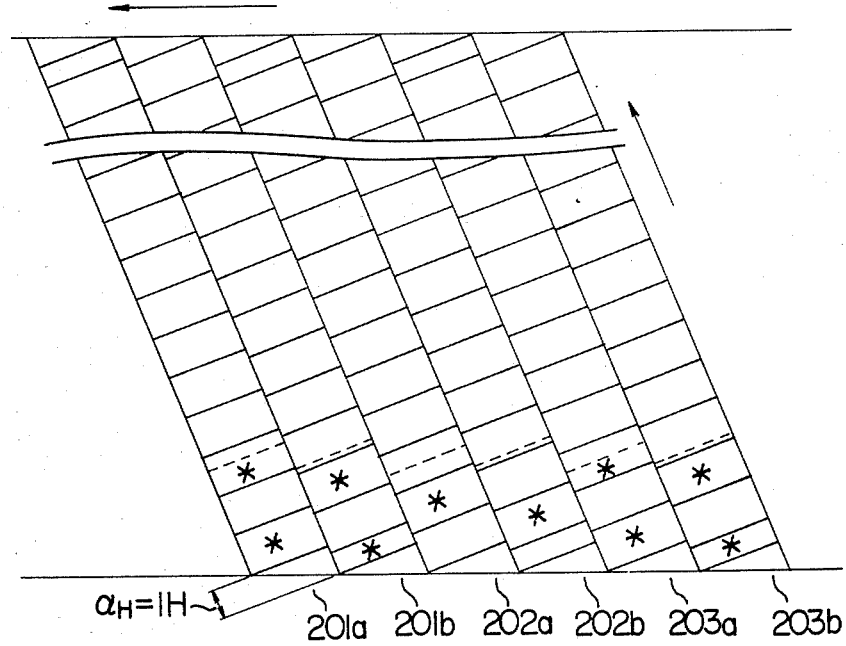
FIG. 26 shows a tape pattern for explaining an effect in a playback mode attained by the present invention.

The playback of the color signal thus recorded is now explained. While a playback circuit is not shown, a sum frequency signal of a low frequency carrier which is not phase-reversed in the first track and phase-reversed for each 1H-period in the second track and an output signal of a crystal VCO which oscillates at approximately 3.58 MHz is multiplied by the reproduced low frequency converted carrier, and a difference frequency signal is extracted to reproduce the original signal. Accordingly, if the horizontal period of the phase reversal of the low frequency carrier in the second track is matched to that in the record mode and the same track switching signal as that in the record mode is used, the original phase can be restored. When the track switching signal is different from that in the record mode, a phase compensation error occurs in the vicinity of track switching but the original phase can be restored in a steady state. FIG. 26 shows an example of a phase relation of the playback color signal when the track switching signal in the normal playback mode is retarded by 2.5H with respect to that in the record mode. Broken lines in FIG. 26 show the positions of the track switching signal and the marks * represent positions of 180-degree phase error. While the phase compensation error occurs in the vicinity of the track switching point, the original phase is perfectly restored except for the error portion. Accordingly, a normal quality of image can be reproduced without compensating the phase reversal error in the vicinity of the track switching point. If the present invention is not used, it is difficult to determine the 180-degree phase reversal point of the color signal on the tape so that the phase compensation error may occur or not occur between the tracks for each switching of the track and hence the phase reversal error must always be compensated. As a result, the color response in the playback mode is slower than that of the present invention.

In the special playback mode, the following advantage is obtained. In the search playback mode of $\alpha H = 1H$ as shown in FIG. 25, if the second track head jumps from the track 201b to the track 202b, it is predicted that the timing for compensating the phase reversal is deviated by 1H. Accordingly, by shifting the timing for compensating the phase reversal by 1H at the track jump point, the normal phase of the playback color signal can be restored. The same is applicable when $\alpha H = 2H, 3H, \ldots$. When $\alpha H = 0.5H, 1.5H, \ldots$ there is no shift of the timing for compensating the phase reversal at the track jump point and hence no compensation is needed.

Thus, according to the present embodiment, the number and cost of peripheral circuits are reduced because of the IC structure and the quality of the reproduced image is improved.

Figure 27:
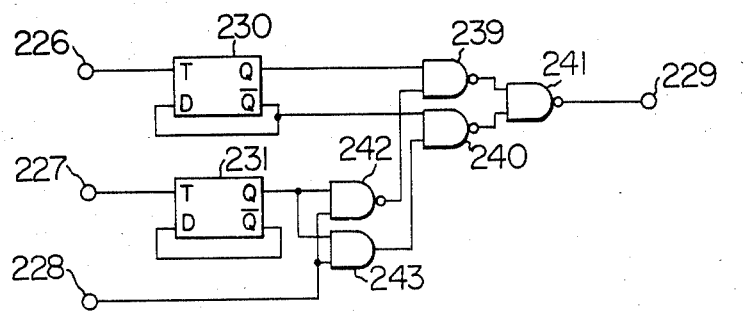
FIG. 27 shows a circuit diagram of other embodiment of the phase inverter of the present invention.
Figure 28:
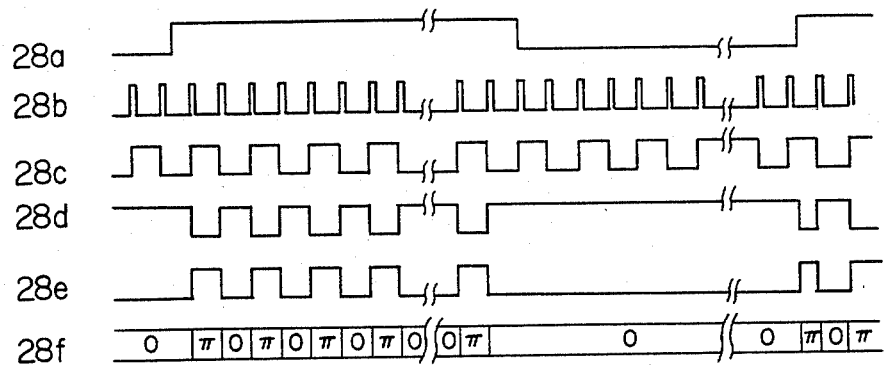
FIGS. 28a–28f show waveforms for explaining an operation of the circuit of FIG. 27.

FIG. 27 shows another embodiment of the one-to-two frequency divider 223 and the phase inverter 224 encircled by a broken line in FIG. 22. In FIG. 27, numerals 239–242 denote NAND circuits, numeral 243 denotes an AND circuit and other numerals denote like elements in FIG. 23. FIG. 28a–28f show time charts for explaining the operation of the circuit of FIG. 27. The one-to-two frequency divided Q-output of the flip-flop 230 having the frequency of $(47+\frac{1}{4}) f_H$ is supplied to the NAND 239 and the $\overline{Q}$-output is supplied to the NAND 240. On the other hand, the horizontal synchronizing pulse 28b from the input terminal 227 is supplied to the flip-flop 231, which produces at the Q-output thereof a signal 28c which phase-reverses for each 1H-period. The signal 28c is supplied to the NAND 242 and the NAND 243. On the other hand, the track signal 28a from the input terminal 228 is supplied to the NAND 242 and the NAND 243 so that the signal 28d is produced at the output of the NAND 242 and the signal 28e is produced at the output of the AND 243. Those signals are supplied to the NAND 239 and the NAND 240, respectively. As a result, the signal 28f is produced at the output terminal 229, which signal has a phase O in the first track and is phase-reversed for every 1H-period in the second track, in the same manner as in FIG. 23.

The operation for the NTSC system has thus been explained. In the PAL system, it is also desirable to shift the phase by the low frequency carrier and define the amount of phase shift in the tape track in order to improve the quality of the image. The operation for the PAL system now will be briefly explained.

In the PAL system, in order to suppress the cross-talk component of the color signal from the adjacent tracks, an offset of $f_H/4$ is imparted to the recording low frequency converted color signals of adjacent tracks and a 2H comb filter for the color signal is provided in the playback circuit. The offset of $f_H/4$ may be imparted by a double frequency system in which the low frequency converted color signal frequencies of the adjacent tracks have a difference of $f_H/4$ therebetween or a one-track 90-degree phase shift system in which the low frequency converted color signal of only one track is phase shifted by 90 degrees. When the phase shift system is used, it is desirable to define the amount of phase shift on the tape track.

Figure 29:
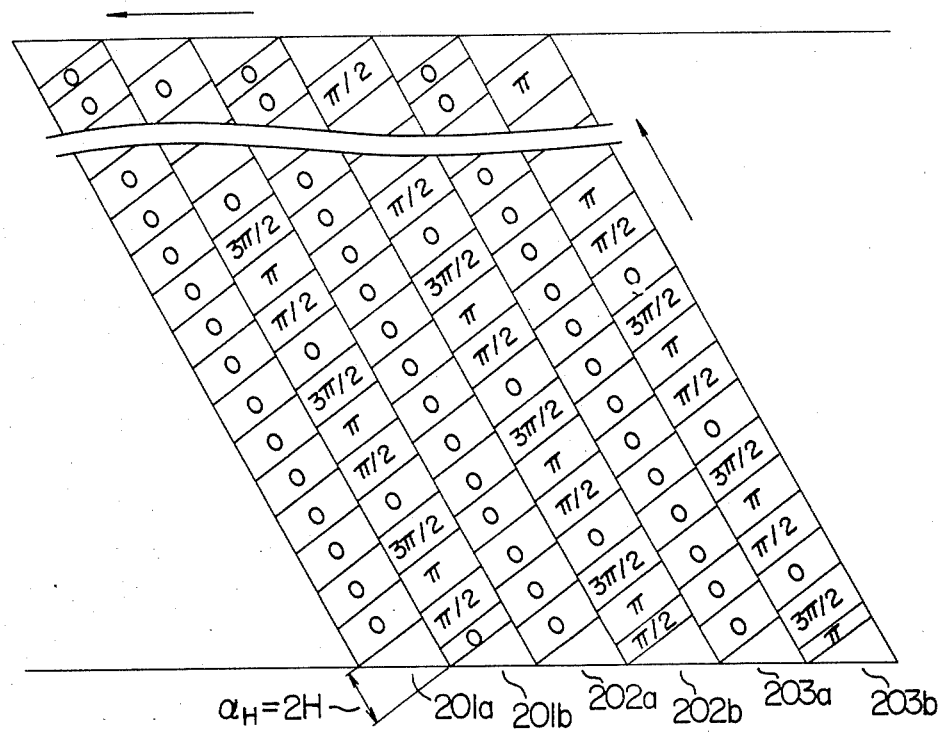
FIG. 29 shows a recorded tape pattern which is desirable to the PS system in the PAL color signal recording system.
Figure 30:
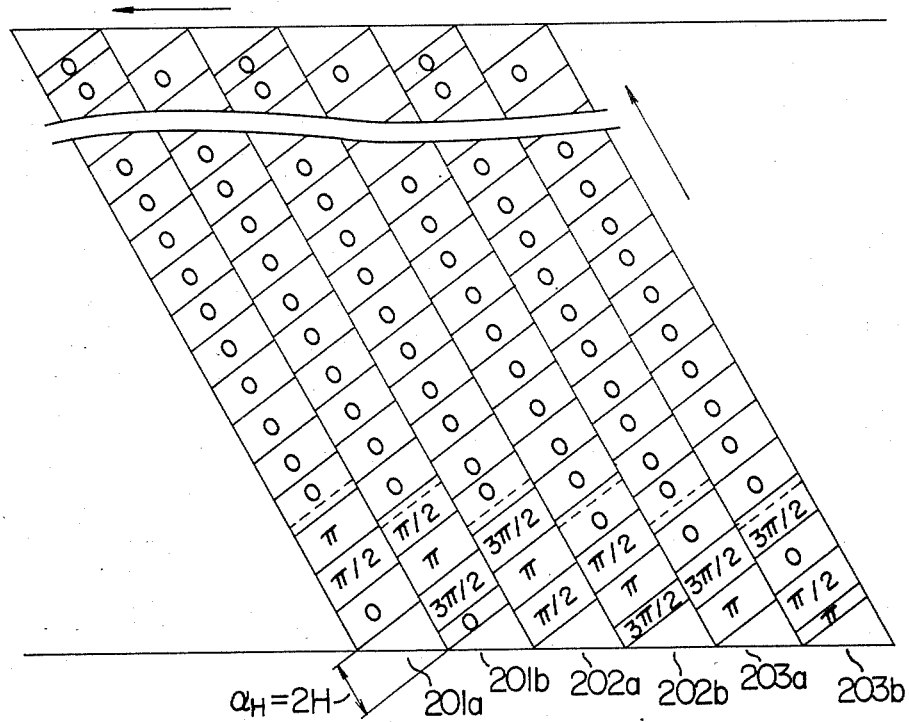
FIG. 30 shows a tape pattern for explaining an effect in a playback mode attained by the recording system of FIG. 29.

FIG. 29 shows an example of a tape pattern recorded by converting the color signal to a low frequency by the low frequency carrier which is phase shifted by 90 degrees for each 1H-period in the first track and is not phase shifted in the second track. In FIG. 29, the deviation $\alpha H$ of the H from the adjacent track is 2H and each block represents 1H-period and a figure in each block represents the amount of phase shift of the low frequency converted color signal. By matching the horizontal period for phase shifting the low frequency carrier in the second track with that in the record mode, the original phase can be restored if the same track switching signal as that in the record mode is used, in the same manner as in the NTSC system. When the track switching signal is different from that in the record mode, a phase compensation error occurs in the vicinity of the track switching point as shown in FIG. 30 but the original phase is restored in a steady state. FIG. 30 shows the example in which the track switching signal in the normal playback mode is retarded by 3H with respect to that in the record mode. The phase compensation error occurs in the vicinity of the track switching point but the original phase can be perfectly restored except for the error portion. Thus, the quality of the reproduced image can be improved as is done in the NTSC system.

In the special playback mode, the same advantage as that in the NTSC system is attained. When $\alpha H = 2H$, a phase compensation error of 90 degrees occurs at the track jump point. Thus, by correcting the 90-degree phase compensation error at the track jump point, the normal phase of the reproduced color signal is restored and the quality of the produced image can be improved. The amount of phase compensation error varies with $\alpha H$. For example, when $\alpha H = 1H$, it is 270 degrees, when $\alpha H = 1.5H$ it is 0 degree and when $\alpha H = 2.5H$ it is 180 degrees. Thus, the phase compensation error may be corrected depending on $\alpha H$.

Figure 31:
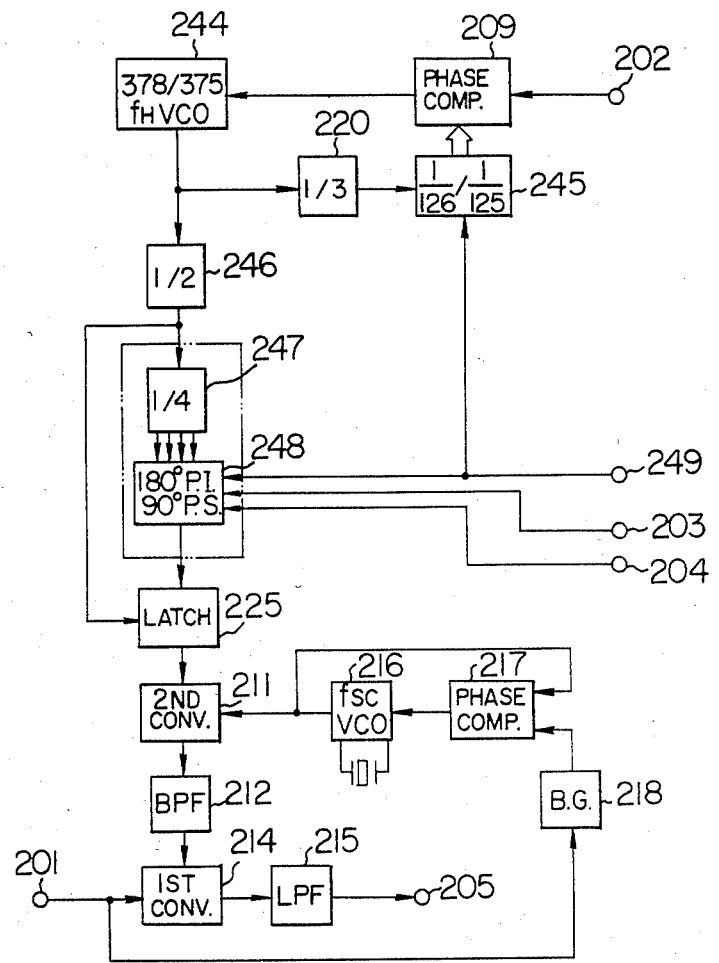
FIG. 31 shows a circuit diagram of one embodiment of an NTSC/PAL circuit when the PI system is used for the NTSC system and the PS system is used for the PAL system.

FIG. 31 shows an embodiment of the color signal recording circuit for the PAL system which uses the color signal recording circuit for the NTSC system shown in FIG. 22. In FIG. 31, for the NTSC system, the low frequency converted color signal frequency is selected to be $(47+\frac{1}{8}) f_H$ in the first track and to be $(47+\frac{1}{8}\pm\frac{1}{2}) f_H$ with the phase reversed for each 1H-period in the second track, and for the PAL system, the frequency is selected to be $(47-\frac{1}{8}) f_H$ in the first track and to be $(47-\frac{1}{8}-\frac{1}{4}) f_H$ or $(47-\frac{1}{8}+\frac{1}{4}) f_H$ in the second track so that the phase is shifted by $-90$ degrees or $+90$ degrees for each 1H-period.

The embodiment of FIG. 31 differs from FIG. 22 in that the oscillation frequency of the VCO 244 is $(47+\frac{1}{8}) f_H \times 8 = 378 f_H$ for the NTSC system and $(47-\frac{1}{8}) f_H \times 8 = 375 f_H$ for the "PAL" system so that the frequency division factors of the frequency divider 245 are different for the NTSC system and the PAL system, that is, 126 and 125, respectively, and that a one-to-four frequency divider 247 is connected to the output of the one-to-two frequency divider 246 which frequency divides the output of the VCO 244 and the outputs having a phase difference of 90 degrees from the one-to-four frequency divider 247 are supplied to the phase shifter 248, which under the control of an NTSC/PAL switching signal from the input terminal 249, produces a non-phase reversal signal of $(47+\frac{1}{4}) f_H$ in the first track for the NTSC system and a signal which phase-reverses for each IH-period in the second track, as the low frequency carrier, which is supplied to the second frequency converter 211 through the latch circuit 225, and for the PAL system it produces a non-phase reversal signal of $(47-\frac{1}{8}) f_H$ in the first track and a signal which phase-shifts by 90 degrees for each IH-period in the second track, as the low frequency carrier. In this manner, an IC module which can be used for both the NTSC system and the PAL system can be readily prepared.

Figure 32:
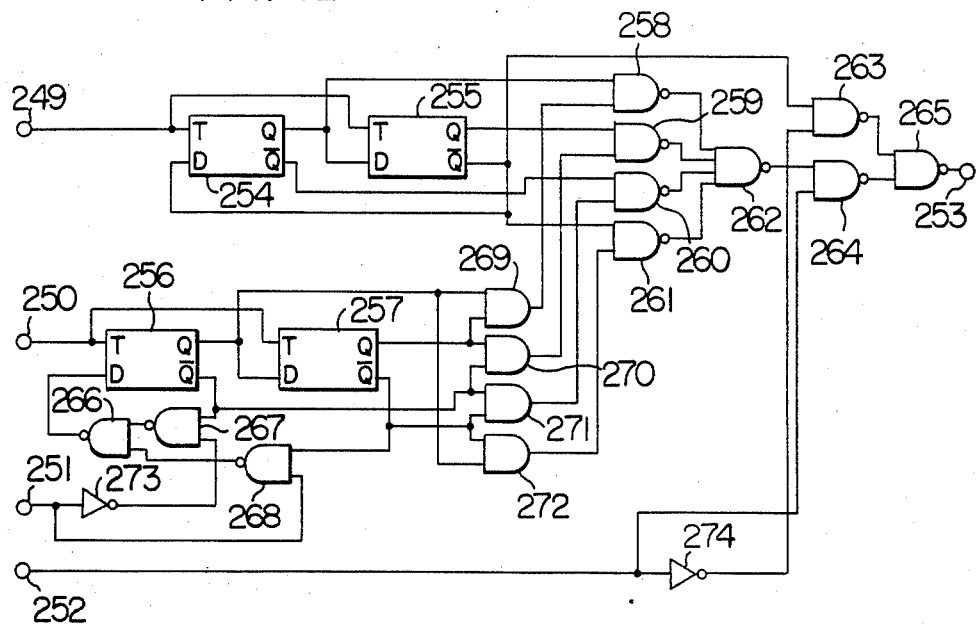
FIG. 32 shows a circuit diagram of one embodiment of a phase shifter used to achieve the NTSC/PAL circuit of FIG. 31.

FIG. 32 shows an embodiment of the one-to-four frequency divider 247 and the phase shifter 248 encircled by broken lines in FIG. 31. In FIG. 32, numeral 249 denotes an input terminal for the one-to-two frequency divided output signal from the VCO 244 of FIG. 31, numeral 250 denotes an input terminal for the horizontal synchronizing signal or a signal synchronized therewith, numeral 251 denotes an input terminal for the NTSC/PAL switching signal, numeral 252 denotes an input terminal for the track switching signal, numeral 253 denotes an output terminal for the low frequency carrier, numerals 254–256 denote flip-flops, numerals 258–268 denote NAND circuits, numerals 269–272 denote AND circuits and numerals 273 and 274 denote inverters. For the NTSC system, the signal of 189 $f_H$ from the input terminal 249 is frequency divided by the flip-flops 254 and 255 by a factor of four to produce the signal of $(47+\frac{1}{4}) f_H$. Assuming that the phase of the Q-output of the flip-flop 254 is O, the phase of the $\overline{Q}$-output of the flip-flop 255 is $-90$ degrees, the phase of the Q-output of the flip-flop 254 is $-180$ degrees and the phase of the $\overline{Q}$ output of the flip-flop 255 is $-270$ degrees. The signals having a phase difference of 90 degrees from the others are supplied to the NANDs 258–261, which are selected by the outputs of the ANDs 269–272 and the selected signal is supplied to the NAND 262. For the NTSC system, if the input terminal 251 is Low, the Q-output of the flip-flop 256 is always supplied to a data input terminal of the flip-flop 256 and the horizontal synchronizing signal from the input terminal 250 is frequency divided by a factor of two. Thus, the Q-output of the flip-flop 256 and the $\overline{Q}$-output of the flip-flop 257 have the same logical value and the $\overline{Q}$-output of the flip-flop 256 and the Q-output of the flip-flop 257 have the same logical value and hence the output of the AND 269 is always LOW and the outputs of the ANDs 270 and 272 are alternately HIGH and LOW for every IH-period. Thus, the Q-output and the $\overline{Q}$-output of the flip-flop 255 having a phase difference of 180 degrees therebetween are supplied to the NAND 262. The Q-output and the $\overline{Q}$-output of the flip-flop 255 having a phase difference of 180 degrees are alternately supplied to the NAND 264 for every 1H-period and the $\overline{Q}$-output of the flip-flop 255 is supplied to the NAND 263, and those signals are selected by the track switching signal from the input terminal 252 and supplied to the output terminal 253. As a result, for the NTSC system, the $\overline{Q}$-output of the flip-flop which does not reverse the phase is supplied in the first track and the Q-output and the $\overline{Q}$-output of the flip-flop 255 having a phase difference of 180 degrees therebetween are alternately supplied for energy IH-period. Thus, the low frequency carrier similar to that of the embodiment of FIG. 22 is produced and a record pattern as shown in FIG. 23 is produced.

On the other hand, for the PAL system, the signal of 375/2 $f_H$ from the input terminal 249 is frequency divided by the flip-flops 254 and 255 by a factor of four so that a signal of a frequency of $(47-\frac{1}{8}) f_H$ is produced. In this case, like in the NTSC system, signals having a phase difference of 90 degrees therebetween are produced at the outputs of the flip-flops 254 and 255 and are applied to the NANDs 258–261. Since the input terminal 251 is HIGH for the PAL system, the $\overline{Q}$-output of the flip-flop 257 is always supplied to the data input of the flip-flop 256 and the horizontal synchronizing signal from the input terminal 250 is frequency divided by the factor of four. Accordingly, the outputs of the ANDs 269–272 sequentially assume a HIGH level for 1H-period in the order of 269 to 272 and the outputs are supplied to the NANDs 258–261. As a result, the Q-output of the flip-flop 254, the Q-output of the flip-flop 255, the $\overline{Q}$-output of the flip-flop 254 and the $\overline{Q}$-output of the flip-flop 255 which are sequentially retarded by 90 degrees are supplied to the NAND 262. In this manner, the signal which is retarded by 90 degrees for every 1H-period and the $\overline{Q}$-output of the flip-flop 255 which does not phase-shift for every 1H-period are selected by the track switching signal from the input terminal 252 so that the low frequency carrier does not phase-shift in the first track and phase-shifts by 90 degrees for every 1H-period in the second track. Thus, a recorded tape pattern of the low frequency converted color signal as shown in FIG. 29 is produced.

According to the embodiment of FIG. 32, the phase shifter 248 of FIG. 31 can be used for both the NTSC system and the PAL system, and the color signal recording circuit which satisfies the present invention can be readily implemented by an IC module.

Figure 33:
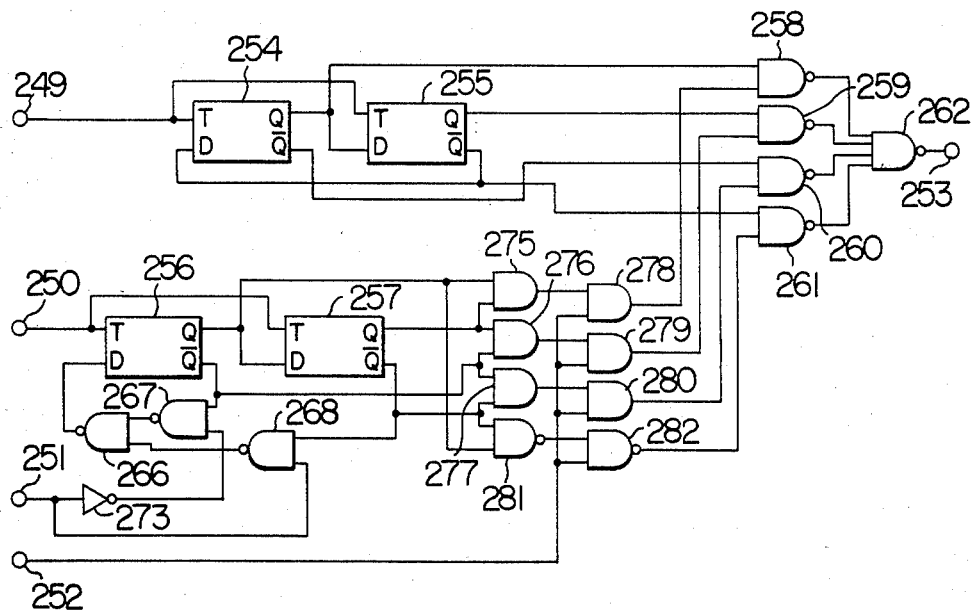
FIG. 33 shows a circuit diagram of another embodiment of the phase shifter used to achieve the NTSC/PAL circuit of FIG. 31.

FIG. 33 shows another embodiment of the one-to-four frequency divider 247 and the phase shifter 248 which is different from that shown in FIG. 32. The present embodiment differs from that of FIG. 32 in that the Q-output and the $\overline{Q}$-output of the flip-flops 256 and 257 are supplied to the AND's 275–277 and the NAND 281, the outputs thereof are supplied to the AND's 278–280 and the NAND 282, respectively, where they are logically combined with the track switching signal from the input terminal 252, and the outputs thereof are supplied to the NAND's 258–261 to produce the low frequency carrier similar to that of FIG. 32. For the NTSC system, the outputs of the AND's 275 and 277 are LOW and the outputs of the AND 276 and the NAND 281 are HIGH and LOW for every other IH-period, and when the track switching signal from the input terminal 252 is HIGH in the second track, the outputs of the AND's 278 and 280 are LOW and the outputs of the AND 299 and the NAND 282 are alternately HIGH and LOW for every other IH-period. Thus, the $\overline{Q}$-output and the Q-output of the flip-flop 255 which phase-reverse for each IH-period are produced at the output terminal 253.

On the other hand, when the track switching signal from the input terminal 252 is LOW in the first track, the outputs of the AND's 278–280 are LOW and the output of the NAND 282 is HIGH so that the non-phase several Q-output of the flip-flop 255 is produced at the output terminal 253.

For the PAL system, when the input terminal 252 is HIGH in the second track, the outputs of the AND's 278–280 and the NAND 282 sequentially assume the HIGH level for IH-period in the order of 278–280, 282 so that the signal which is retarded by 90 degrees for each IH-period is produced at the output terminal 253. When the input terminal 252 is LOW in the first track, only the output of the NAND 282 is HIGH and the non-phase reversal Q-output of the flip-flop 255 is produced.

In this manner, the embodiment of FIG. 33 also attains a characteristic similar to that of FIG. 32.

In the above embodiment, the frequency of the low frequency converted color signal for the NTSC system is set to $(47 + \frac{1}{4}) f_H$. The present invention is not limited to the specific frequency but it is applicable to any phase inversion system in which the low frequency converted color signal is phase-reversed in the one track.

The present invention is also not limited to the frequency of the low frequency converted color signal of the PAL system but it is applicable to any phase shift system in which the signal is phase-shifted by 90 degrees in the one track.

Figure 34:
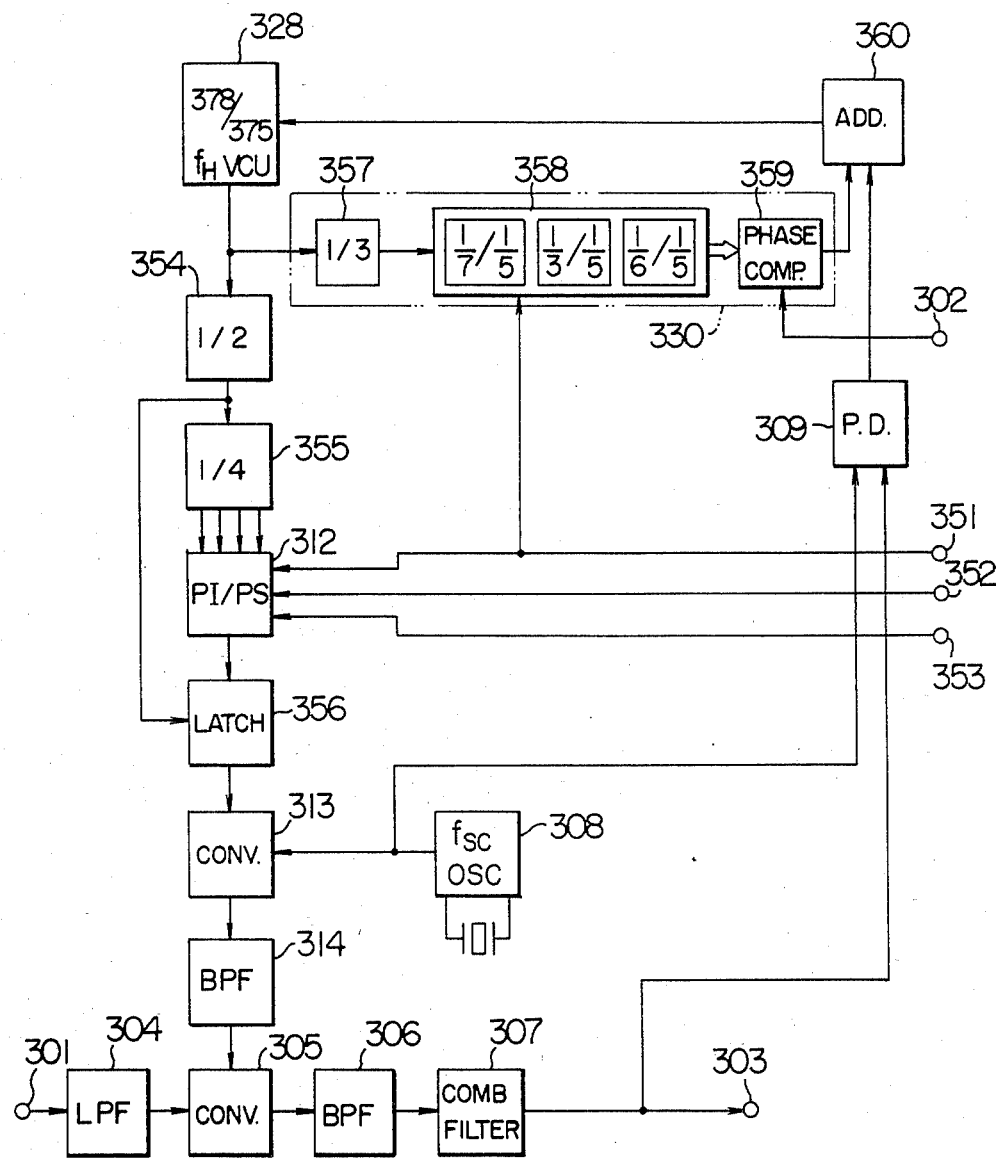
FIG. 34 shows a circuit diagram of one embodiment of the color signal playback circuit which uses a concept of the color signal recording circuit of FIG. 35 shows a circuit diagram of one embodiment of a frequency divider of the present invention.

FIG. 34 shows one embodiment of the color signal playback (reproducing) circuit for playing back the video tape on which the low frequency converted color signal was recorded by the 180-degree phase inversion system for the NTSC system and the 90-degree phase shift system for the system.

In FIG. 34, the low frequency converted color signal from an input terminal 301 is reconverted to the original frequency (approximately 3.58 MHz for the NTSC system and approximately 4.43 MHz for the PAL system) by a first frequency converter 305 and it is supplied to an output terminal 303. The NTSC/PAL discrimination signal is applied to a terminal 351 so that the frequency division factor of a frequency divider 358 of a frequency discriminator 330 which comprises frequency dividers 357 and 358 and a phase comparator 359, is switched for the NTSC system and the PAL system, and the low frequency converted carrier supplied to a second frequency converter 313 is phase-shifted by a phase shifter 312 by the 180-degree phase inversion system for the NTSC system and the 90-degree phase shift system for the PAL system for each IH-period, and the phase shift of the low frequency converted color signal from the input terminal 301 is returned to the original continuous phase.

Numeral 352 denotes an input terminal for the pulse which phase-reverses for each IH-period, numeral 353 denotes an input terminal for the signal indicating the field, or track and numeral 360 denotes an adder which adds the detection signal of the frequency error of the VCO 328 by the frequency discriminator 330 to a phase error signal between a burst signal of the reproduced color signal from the output terminal 303 and the carrier signal from the oscillator 308 which oscillates at $f_{sc}$ (approximately 3.58 MHz for the NTSC system and approximately 4.43 MHz for the PAL system).

The both error signals are supplied to the VCO 328 to control the oscillation frequency of the VCO 328.

Figure 35:
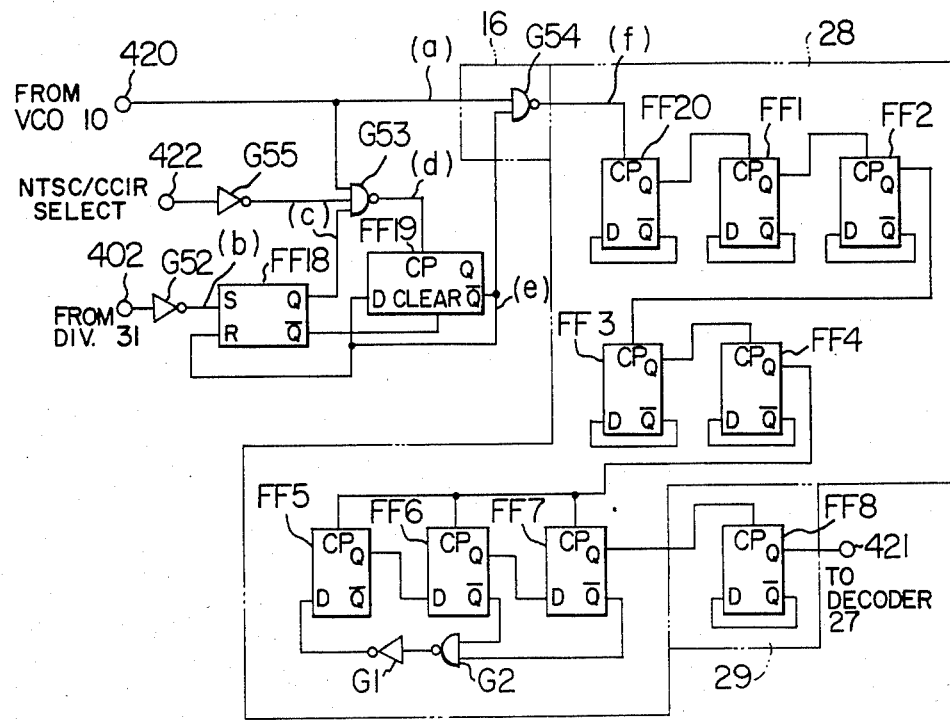
Figure 36:
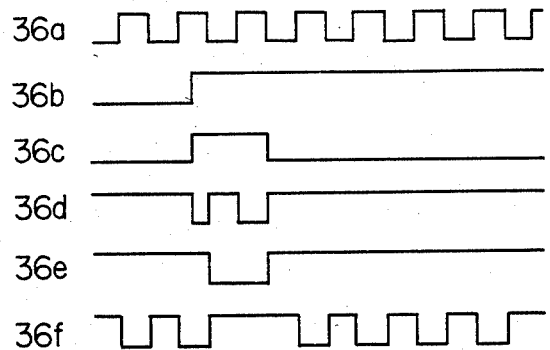
FIGS. 36a–36f show waveforms in the circuit of FIG. 35.

Referring to FIG. 35, another embodiment of the present invention, in which the oscillation frequency of the VCO which is different between the NTSC system and the PAL system is detected by digitally counting the output pulses of the VCO and the output pulses of the VCO are counted by a circuit for controlling the oscillation frequency of the VCO. In FIG. 35, the oscillation frequency of the VCO 10 is set at for example 320 $f_H$ for the NTSC system and 321 $f_H$ for the PAL system, FF18 denotes an edge trigger type R-S flip-flop, FF19 denotes a D-type flip-flop having a clear function, FF20 denotes a D-type flip-flop, G52 and G55 denote inverters, G53 denotes a three-way NAND, G54 denotes a two-way NAND, FF1–FF4 and FF8 denote one-to-two frequency dividers, FF5 to FF7 denote D-type flip-flops which form a one-to-five frequency divider, and G1 and G2 denote an inverter and a NAND, respectively. Those circuits form a 1-to-160 frequency divider. The output from the VCO is supplied to a fourth input terminal 420. Numeral 422 denotes a terminal for a control signal, which is HIGH for the NTSC system and LOW for the PAL system. The horizontal synchronizing signal is applied to the second input terminal 402. As a result, the S-R type flip-flop FF18 is set at the falling edge of the horizontal synchronizing signal or at the rising edge of the output from the inverter G52 as shown in FIG. 36e. Thus, the Q-output of the flip-flop FF18 assumes the HIGH level as shown in FIG. 36c. For the PAL system, since the output of G55 is HIGH, the input pulse from the fourth input terminal 420 which is the remaining input terminal of G53 is inverted. The Q-output of FF18 assumes the LOW level so that the clearing of FF19 is released to permit the frequency division by FF19.

As a result, the Q-output of FF19 produces a frequency divided output in response to the input clock as shown in FIG. 36e. Since the Q-output of FF19 is supplied to the R-input of FF18, it is reset at the leading edge so that the Q-output of FF18 again assumes the LOW level and the gate G53 is closed. Thus, the output of G53 assumes the HIGH level consequently, the Q-output of FF19 is kept HIGH until the next horizontal synchronizing pulse is supplied. By ANDing the Q-output of FF19 and the input pulse to the fourth input terminal 20, a signal having pulses eliminated during the LOW Q-output period of FF19 is produced as shown in FIG. 36f.

If the number of pulses applied to the fourth input terminal 420 in the (IH-period is equal to for example 321, 320 pulses are applied to a CP-terminal of FF20. These pulses are counted down by FF20 by the factor of two, and by the FF1–FF8 by the factor of 160, that is, by the factor of 320 in total, and the phase comparison of the output pulse and the horizontal synchronizing pulse results in a stable state. Accordingly, the VCO 10 oscillates at exactly 321 $f_H$. Since the frequency divider produces 160 pulses of one polarity and 161 pulses in the other polarity, the duty factor is 50.2% or 49.8%, which is approximately 50%. For the NTSC system, the output of G55 is low, the output of G53 is always HIGH, the Q-output of FF19 is always HIGH and the input pulse to the fourth input terminal 420 is directly applied to the CP-terminal of FF20. Accordingly, the VCO oscillates at exactly 320 $f_H$ and the duty factor is exactly 50%.

Figure 37:
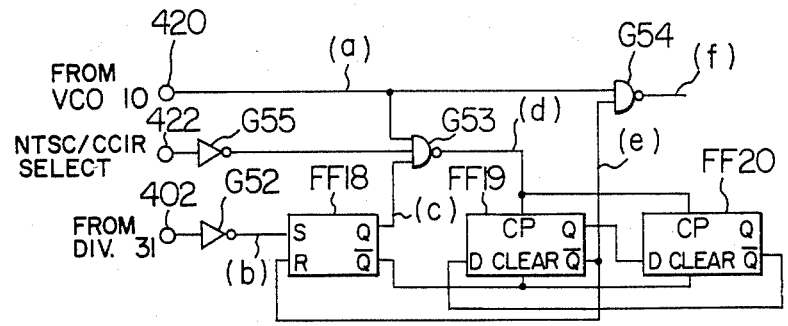
FIG. 37 shows a circuit diagram of another embodiment of the frequency divider of the present invention.
Figure 38:
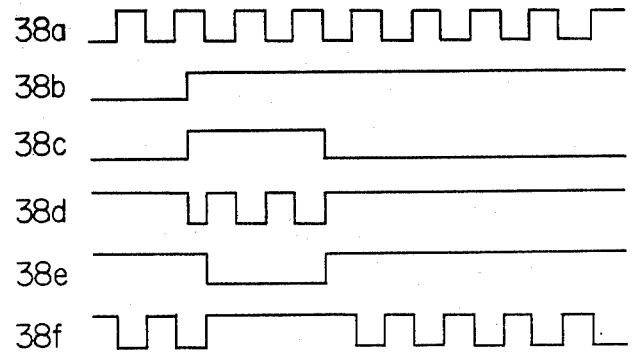
FIGS. 38a–38f show waveforms in the circuit of FIG. 37.
Figure 39:
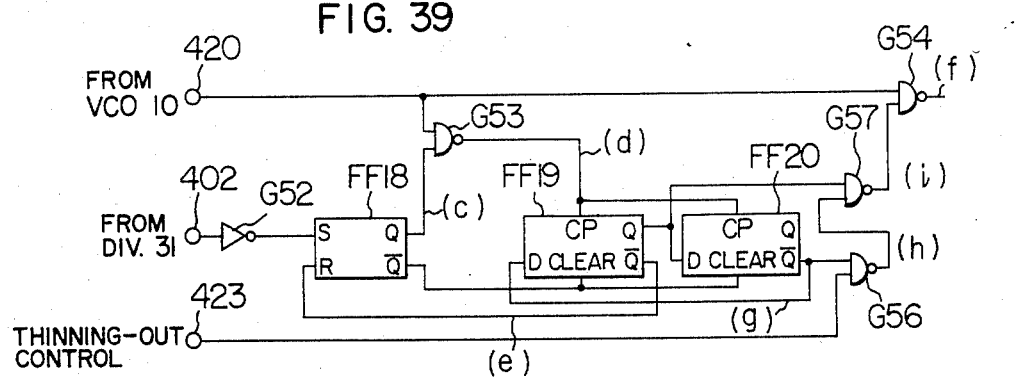
FIG. 39 shows a circuit diagram of another embodiment of the frequency divider of the present invention.
Figure 40:
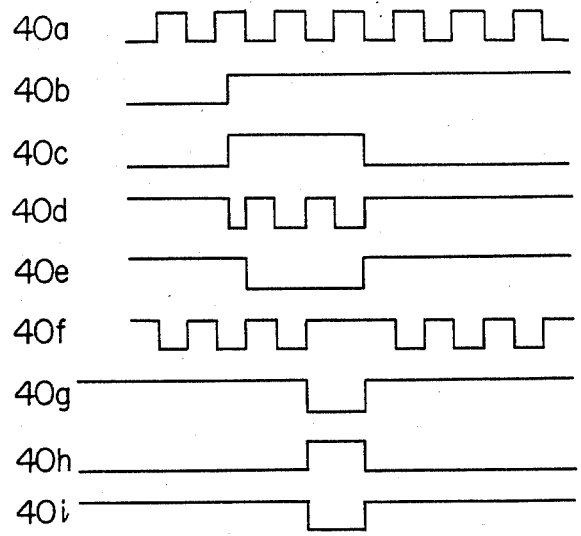
FIGS. 40a–40i show waveforms in the circuit of FIG. 39.

In FIG. 35, the frequency division factors are 320 and 321 with a difference of one therebetween. If the frequency division factors are 320 and 322 with the difference of two therebetween, the gating is effected by a signal of a pulse duration which assures the elimination of two pulses as shown in FIG. 37. In this case, FF19 and FF20 form a one-to-four frequency divider and the Q-output of FF19 is widened as shown in FIG. 38e. As a result, the signal having two pulses eliminated is produced at the output of G54 as shown in FIG. 38f. When the frequency division factors are 321 and 322 with the difference of one therebetween, a 1-to-321 frequency divider is required in the final stage and the frequency divider is complex if the pulse is selectively eliminated or passed. By selectively eliminating one pulse and two pulses as shown in FIG. 39, a 1-to-320 frequency divider may be used in the final stage and the frequency divider is simple. In FIG. 39, when a second control signal input terminal 423 is HIGH, the inversion of the frequency divided pulse shown in FIG. 40g is produced at the output of G57, as shown in FIG. 40h. Accordingly, the inversion of the pulse of FIG. 40h is produced at the output of G57 as shown in FIG. 40i and one pulse is eliminated from the output of G54. When the second control signal input terminal 423 is LOW, the output of G56 remains HIGH and the inversion of the Q-output of FF19, that is, the same pulse as the $\overline{Q}$-output of FF19 is produced at the output of G57. Thus, two pulses are eliminated from the output as shown in FIG. 38f.

Figure 41:
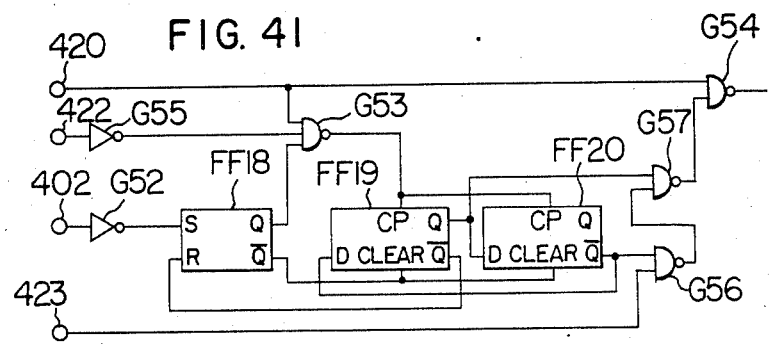
FIG. 41 shows a circuit diagram of another embodiment of the frequency divider of the present invention.

In order to attain three frequency division factors 320, 321 and 322, a configuration as shown in FIG. 41 may be used. When the control signal input terminal 422 is HIGH, G53 remains HIGH and the input pulse is gated. When the control signal input terminal 422 is LOW and the second control signal input terminal 423 is HIGH, one pulse in eliminated is the same manner as in FIG. 39, and when the control signal input terminal 422 is LOW and the second control signal input terminal 423 is LOW, two pulses are eliminated in the same manner as in FIG. 39.

In the above description, the pulses from the VCO are eliminated. When the difference of the frequency division factor is two or more as shown in FIG. 37, the pulses may be eliminated in the frequency divider. When the frequency division factors are 320 and 322, for example, the frequencies are first divided by two to get the frequency division factors of 160 and 161, respectively. Thus, one pulse may be eliminated in the course of one-to-two frequency division. When the frequency division factors are 375 and 378, the frequencies are divided by three to get the frequency division factors of 125 and 126, respectively. Thus, a switching circuit for selecting the one-pulse elimination and the two-pulse elimination is arranged in the succeeding stage to the one-to-three frequency divider. In this manner, a frequency divided output having a duty factor of approximately 50% is produced.

Figure 42:
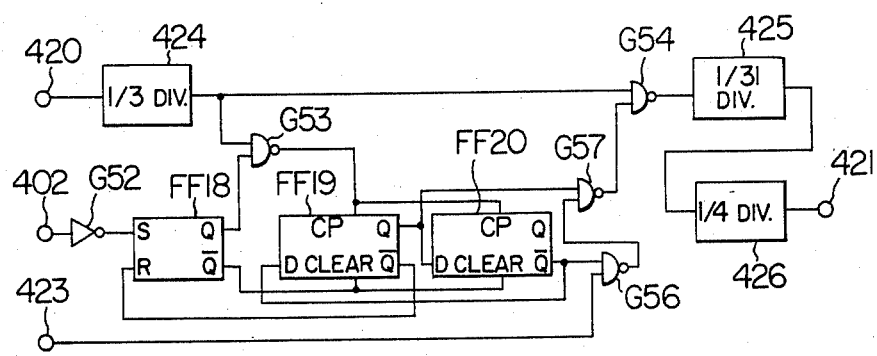
FIG. 42 shows a circuit diagram of another embodiment of the frequency divider of the present invention.

In FIG. 42, numeral 424 denotes a one-to-three frequency divider, numeral 425 denotes a 1-to-31 frequency divider, numeral 426 denotes a one-to-four frequency divider and numerals 425 and 426 denote 1-to-124 frequency dividers.

Figure 43:
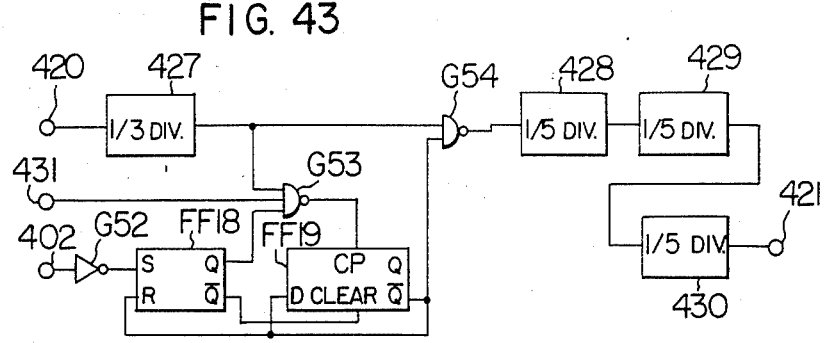
FIGS. 43 to 45 show circuit diagrams of other embodiments of the frequency divider of the present invention.

If the duty factor of the pulse is not important, a switching circuit for selecting the one-pulse elimination or the two-pulse elimination may be arranged in the succeeding stage to the one-to-three frequency divider 427, as shown in FIG. 43. Numerals 428, 429 and 430 denote one-to-five frequency dividers which frequency-divide by the factor of 125 in total. Numeral 431 denotes a control signal input terminal for selecting the frequency division factor of 378 or 375. When the control signal is HIGH, the frequency division factor of 375 is selected.

Figure 44:
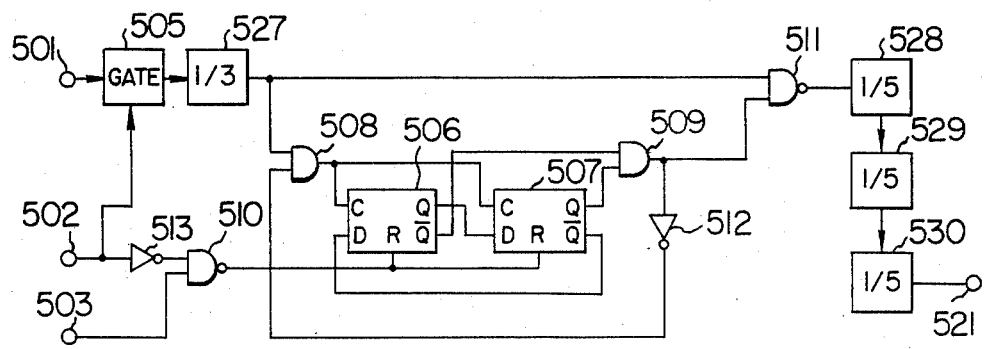

FIG. 44 shows an embodiment which does not switch counters 528-530 for counting the number of pulses of the VCO oscillating at 378 $f_H$ for the NTSC system and at 375 $f_H$ for the PAL system but eliminates three pulses, for example, from the pulses applied to the counters for the NTSC system.

The present embodiment is suitable for the counter used in the frequency discriminator in the playback circuit. For example, when the output signal, of the VCO is to be counted for the 3H-period of the 6H-period by the control signal from a terminal 502, one pulse is eliminated from the output of the one-to-three frequency divider 527 in an early stage of the 3H-period for the NTSC system so that the counters 528, to 530 can be used for both the NTSC system and the PAL system.

The input terminal 503 is HIGH for the NTSC system and it releases the reset of flip-flops 506 and 507 for the 3H-period during which a gate circuit 505 is opened for the NTSC system.

FIG. 44 can also be used when the oscillation frequency of the VCO is 378 $f_H$ for the NTSC system and 381 $f_H$ for the PAL system. In this case, the terminal 503 is HIGH for the PAL system and the frequency dividers 528-530 may have the frequency division factors of 7, 3 and 6, respectively.

Figure 45:
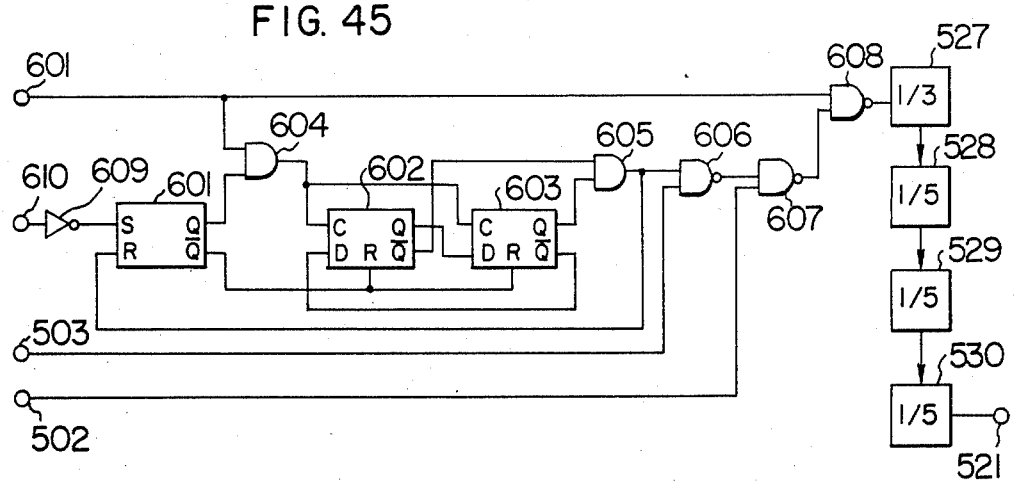

FIG. 45 shows an embodiment which shares an AFC counter in a recording circuit with a frequency discriminator in a playback circuit when the oscillation frequency of VCO is 378 $f_H$ for the NTSC system and 375 $f_H$ for the PAL system. For the NTSC system, three pulses are eliminated from the output of the VCO in each 1H-period.

In the present embodiment, a pulse which is synchronized with the horizontal synchronizing pulse is applied to a terminal 610 and the reset condition of the flip-flops 602 and 603 is released for each input pulse. When three pulses from a terminal 601 are counted, an AND gate 604 is closed. A control signal which is HIGH for the NTSC system is applied to a terminal 503, and a control signal which is HIGH in a record mode and LOW for the 3H-period of the 6H-period in a playback mode is applied to a terminal 502. As a result, an output of an AND gate 605 is supplied to a NAND gate 607 only for the NTSC system, and three pulses are eliminated from the terminal 601 in each 1H-period in the record mode and the output is supplied to the counters 527-530. In the playback mode, three pulses are eliminated from the terminal 601 in each 1H-period only for the 3H-period of the 6H-period and the output is supplied to the counters 527-530, but the output is not supplied in the other 3H-period. For the PAL system, the pulses from the terminal 601 are not eliminated and supplied, to the counters 527-530 for the 3H-period of the 6H-period.

In the above description, the horizontal synchronizing pulse is used as a reference signal for phase-synchronizing the VCO. However, the present invention is not limited to the use of the horizontal synchronizing pulse. While the elimination of the pulses in the frequency divider is effected by the same pulse as that applied to the phase comparator in the above description, a phase which is out of phase with respect to the pulse applied to the phase comparator may be used or any other pulse related to the pulse applied to the phase comparator may be used.

While the output pulse of the VCO applied to the frequency divider is continuous in the above description, the present invention is equally applicable when the pulse applied to the phase comparator is frequency divided to intermittently open the gate.

What is claimed is:

1. A color signal processing circuit in a video tape recorder for reproducing a color signal from a low frequency converted color signal in the NTSC system or the PAL system, comprising:

a voltage controlled oscillator for generating a carrier having a frequency equal to 3N times the horizontal synchronizing frequency of a video signal and eight times that of a low-frequency sub-carrier frequency, where N is an integer;

detection means for detecting variation of the oscillation frequency of said voltage controlled oscillator in a reproduction mode;

suppression means for suppressing the change of the oscillation frequency of said voltage controlled oscillator by an output signal from said detection means to a suppression range for the NTSC system which is equal to or wider than that for the PAL system; and frequency switching means for selectively changing the center oscillation frequency of said voltage controlled oscillator between one value for the NTSC system and another value for the PAL system.

2. A color signal processing circuit according to claim 1 wherein said frequency switching means includes a circuit responsive to an output of said voltage controlled oscillator and a PAL/NTSC selection control signal to switch a frequency division factor for the output of said voltage controlled oscillator and a switch circuit for switching an input to a phase comparator of said suppression means.

3. A color signal processing circuit according to claim 1 wherein said detection means, said frequency switching means, said suppression means and said voltage controlled oscillator form an automatic frequency control loop, said detection means includes a gate circuit controlled by a frequency-divided horizontal synchronizing signal, said frequency switching means includes a pulse eliminating frequency divider so that a signal indicating center frequencies of different pull-in ranges for the PAL system and the NTSC system is produced, and said suppression means is responsive to the signal from said frequency divider to supply a control voltage for changing the center oscillation frequency to said voltage controlled oscillator.

4. A color video signal processing circuit comprising:
a video reproduction signal input terminal;
a low-pass filter connected to said input terminal for extracting a low frequency converted carrier color signal;
a voltage controlled oscillator oscillating at a first frequency;
a fixed oscillator oscillating at a second frequency;
a frequency divider for frequency dividing an output frequency of said voltage controlled oscillator;
a sub-carrier frequency converter for producing a sum frequency of the output of said frequency divider and the output of said fixed oscillator;
a main frequency converter for frequency converting the low frequency converted carrier color signal from said low-pass filter by said sum frequency from said sub-carrier frequency converter to produce a color signal of an original sub-carrier band;
a phase comparator for phase-comparing the output of said main frequency converter with the output of said fixed oscillator to provide a signal indicating a phase di-ference to said voltage controlled oscillator to control the oscillation frequency thereof;
a frequency discriminator for counting an output frequency of said voltage controlled oscillator for a predetermined time period to supply a control voltage to said voltage controlled oscillator in accordance with the result of the counting; and
said frequency discriminator producing control voltages in accordance with whether the NTSC system or the PAL system is being used such that a center frequency ($f_{VCO}$) of said voltage controlled oscillator is set to $nf_H$ and the pull-in range of the voltage controlled oscillator is set ot $\pm kf_H$ for the reproduction mode of the PAL system, and the center frequency is set to $mf_H$ and the pull-in range is set between $\pm df_H$ and $\pm 2kf_H$ for the reproduction mode of the NTSC system, where n and m are different positive integers which are determined depending on the system mode, $f_H$ is a horizontal synchronizing frequency and k is a positive number.

5. A color video signal processing circuit according to claim 4 wherein said frequency discriminator includes a freuqency divider for frequency dividing the output of said voltage controlled oscillator at a variable frequency division factor depending on a NTSC system and the a PAL sytem, and a phase comparator for comparing the output of said frequency divider with the horizontal synchronizing signal $f_H$ of the video signal to produce a control voltage.

6. A color video signal processing circuit according to claim 4 wherein said frequency divider includes a first gate circuit for gating a first pulse signal, a first frequency divider for frequency dividing the output of said first gate circuit by a factor of G, where G is an integer, a second gate circuit for gating the first pulse signal under the control of the output of said first frequency divider, and a second frequency divider for frequency dividing the output of said second gate circuit by a factor of H, where H is an integer, said first gate circuit gating said first pulse signal to a succeeding stage under the control of the second pulse signal phase-compared with the output of said second frequency divider and closing the gate by the output of said first frequency divider, said first frequency divider producing a pulse of a duration sufficient to eliminate (K−H) pulses by said second gate circuit, where K is a required frequency division factor (K≧H) to control said second gate circuit so that the first pulse signal is equivalently frequency divided by the factor of K by one-to-H frequency division by said second frequency divider during one period of the second pulse signal.

7. A color signal processing circuit in a video tape recorder for recording a low frequency converted color signal in a continuous phase in a first track and in alternatively opposite phase for each 1H-period, where 1H period is one horizontal scan period, in a second track, for video signals in the NTSC sytem, comprising:
a circuit for converting a color signal to be recorded to a low frequency carrier;
means including a voltage controlled oscillator oscillating at multiple times of a horizontal frequency $f_H$ for controlling said color signal converting circuit;
a frequency divider for frequency dividing the output of said voltage controller oscillator;

an oscillator having a center oscillation frequency at a frequency of a sub-carrier;

a frequency converter receiving the output of said frequency divider and the output of said subcarrier frequency oscillator to produce a signal having a frequency equal to the sum of the received output frequencies;

another frequency converter connected to receive the output of the first-mentioned frequency converter as a carrier; and a phase shifter provided between said frequency divider and the first-mentioned frequency converter.

8. A color signal processing circuit according to claim 7 wherein, in the NTSC system, one of the low frequency carriers of the color signals in the same horizontal period on the adjacent second tracks is phase-reversed by said phase shifter for recording.

9. A color signal processing circuit according to claim 7 wherein the low frequency carrier of the color signal is recorded in continuous phase in the first track and recorded with the phase shift by 90 degrees for each 1H-period in the second track for a PAL system, and a one-to-four frequency divider is arranged in a preceding stage to said phase shifter and different outputs of said one-to-four frequency divider are selected for the NTSC system and the PAL system whereby 182°-phase reversal is made in the NTSX system and 90°-phase reversal is made in the PAL system, and said phase shifter is used for both the NTSC system and the PAL system.

* * * * *